United States Patent
Lee et al.

(10) Patent No.: US 9,233,339 B2
(45) Date of Patent: Jan. 12, 2016

(54) IONIC LIQUID-FUNCTIONALIZED MESOPOROUS SORBENTS AND THEIR USE IN THE CAPTURE OF POLLUTING GASES

(71) Applicants: UT-Battelle, LLC, Oak Ridge, TN (US); Georgia Tech Research Corporation, Atlanta, GA (US)

(72) Inventors: Jong Suk Lee, Seocho Gu Seoul (KR); William J. Koros, Atlanta, GA (US); Nitesh Bhuwania, Atlanta, GA (US); Patrick C. Hillesheim, Knoxville, TN (US); Sheng Dai, Knoxville, TN (US)

(73) Assignees: UT-BATTELLE, LLC, Oak Ridge, TN (US); GEORGIA TECH RESEARCH CORPORATION, Atlanta, GA (US)

( * ) Notice: Subject to any disclaimer, the term of this patent is extended or adjusted under 35 U.S.C. 154(b) by 333 days.

(21) Appl. No.: 13/868,600

(22) Filed: Apr. 23, 2013

(65) Prior Publication Data
US 2013/0280151 A1    Oct. 24, 2013

Related U.S. Application Data

(60) Provisional application No. 61/636,772, filed on Apr. 23, 2012.

(51) Int. Cl.
*C09K 3/00* (2006.01)
*B01D 53/50* (2006.01)
(Continued)

(52) U.S. Cl.
CPC ............... *B01D 53/62* (2013.01); *B01D 53/02* (2013.01); *B01D 53/508* (2013.01); *B01J 20/223* (2013.01);
(Continued)

(58) Field of Classification Search
CPC .. C09K 3/00; B01D 53/1481; B01D 53/1475; B01D 2053/224; B01D 53/229; B01D 53/50; B01D 53/62; B01D 63/02

USPC ........ 252/184, 189, 190; 423/242.2, 226, 246
See application file for complete search history.

(56) References Cited

U.S. PATENT DOCUMENTS 6,579,343 B2    6/2003    Brennecke et al.
7,318,854 B2    1/2008    Sirkar
(Continued)

FOREIGN PATENT DOCUMENTS

WO    2007/101397 A1    9/2007

OTHER PUBLICATIONS

Antonietti M. et al., "Ionic Liquids for the Convenient Synthesis of Functional Nanoparticles and Other Inorganic Nanostructures", Angew. Chem. Int. Ed. 43:4988-4992 (2004).
(Continued)

*Primary Examiner* — Timothy Vanoy
(74) *Attorney, Agent, or Firm* — Scully, Scott, Murphy & Presser, P.C.

(57) ABSTRACT

A composite structure for capturing a gaseous electrophilic species, the composite structure comprising mesoporous refractory sorbent particles on which an ionic liquid is covalently attached, wherein said ionic liquid includes an accessible functional group that is capable of binding to said gaseous electrophilic species. In particular embodiments, the mesoporous sorbent particles are contained within refractory hollow fibers. Also described is a method for capturing a gaseous electrophilic species by use of the above-described composite structure, wherein the gaseous electrophilic species is contacted with the composite structure. In particular embodiments thereof, cooling water is passed through the refractory hollow fibers containing the IL-functionalized sorbent particles in order to facilitate capture of the gaseous electrophilic species, and then steam is passed through the refractory hollow fibers to facilitate release of the gaseous electrophilic species such that the composite structure can be re-used to capture additional gas.

26 Claims, 3 Drawing Sheets

(51) Int. Cl.
*B01D 53/62* (2006.01)
*B01D 63/02* (2006.01)
*B01J 20/22* (2006.01)
*B01D 53/02* (2006.01)
*B01J 20/28* (2006.01)
*B01J 20/32* (2006.01)

(52) U.S. Cl.
CPC ...... *B01J 20/28028* (2013.01); *B01J 20/28083* (2013.01); *B01J 20/3204* (2013.01); *B01J 20/3263* (2013.01); *B01D 2252/30* (2013.01); *B01D 2257/302* (2013.01); *B01D 2257/502* (2013.01); *B01D 2257/504* (2013.01); *Y02C 10/04* (2013.01); *Y02C 10/08* (2013.01); *Y10T 428/2927* (2015.01); *Y10T 428/2991* (2015.01)

(56) References Cited

U.S. PATENT DOCUMENTS

| | | | |
|---|---|---|---|
| 7,959,720 | B2 | 6/2011 | Deckman et al. |
| 8,133,308 | B2 | 3/2012 | Lively et al. |
| 8,524,388 | B2 | 9/2013 | Dai et al. |
| 2002/0189444 | A1* | 12/2002 | Brennecke et al. ............... 95/45 |
| 2007/0119302 | A1* | 5/2007 | Radosz et al. ...................... 96/5 |
| 2010/0267596 | A1* | 10/2010 | Degen et al. ................. 508/268 |
| 2011/0052466 | A1* | 3/2011 | Liu .............................. 423/230 |
| 2011/0296993 | A1* | 12/2011 | Foo et al. ......................... 95/186 |
| 2012/0247327 | A1* | 10/2012 | Omole ............................... 95/51 |
| 2012/0285320 | A1* | 11/2012 | Heald et al. ....................... 95/49 |
| 2013/0078170 | A1 | 3/2013 | Dai et al. |
| 2014/0130416 | A1* | 5/2014 | Bara et al. ................... 48/127.7 |
| 2014/0309419 | A1* | 10/2014 | Riisager et al. ............... 544/276 |
| 2014/0377156 | A1* | 12/2014 | Okada et al. ................. 423/228 |

OTHER PUBLICATIONS

Bollini P. et al., "Amine-Oxide Hybrid Materials for Acid Gas Separations", Journal of Materials Chemistry 21:15100-15120 (2011).

Kim D-H et al., "Study on Immobilized Liquid Membrane Using Ionic Liquid and PVDF Hollow Fiber as a Support for CO2/N2 Separation", Journal of Membrane Science 372:346-354 (2011).

Kume Y. et al., "Selective Hydrogenation of Cinnamaldehyde Catalyzed by Palladium Nanoparticles Immobilized on Ionic Liquids Modified-Silica Gel", Catalysis Communications 9:369-375 (2008).

Lee J.S. et al., "A New Approach of Ionic Liquid Containing Polymer Sorbents for Post-Combustion CO2 Scrubbing", Polymer 53:891-894 (2012).

Lee J.S. et al., "Hollow Fiber-Supported Designer Ionic Liquid Sponges for Post-Combustion CO2 Scrubbing", Polymer 53:5806-5815 (2012).

Lively R.P. et al., "Hollow Fiber Adsorbents for CO2 Removal from Flue Gas", Ind. Eng. Chem. Res. 48 (15):7314-7324 (2009).

* cited by examiner

US 9,233,339 B2

IONIC LIQUID-FUNCTIONALIZED MESOPOROUS SORBENTS AND THEIR USE IN THE CAPTURE OF POLLUTING GASES

CROSS REFERENCE TO RELATED APPLICATION

This application claims the benefit of priority from U.S. Provisional Application No. 61/636,772, filed on Apr. 23, 2012, the content of which in its entirety is incorporated herein by reference.

This invention was made with government support under Prime Contract No. DE-AC05-00OR22725 awarded by the U.S. Department of Energy. The government has certain rights in the invention.

FIELD OF THE INVENTION

The present invention relates generally to methods for capturing a polluting or environmentally unfriendly gas, such as carbon dioxide or sulfur dioxide, and particularly, such methods in which an ionic liquid (IL) is employed as the capture agent.

BACKGROUND OF THE INVENTION

The emission of carbon dioxide ($CO_2$) and other polluting gases from the burning of fossil fuels has received worldwide attention because of its implication in climate change, which threatens economies and environments. Accordingly, intensive research continues in the search for new materials that can efficiently, reversibly, and economically capture $CO_2$ and other polluting gases. Numerous carbon capture and storage (CCS) technologies have been developed, including post-combustion $CO_2$ capture using amine solvents, oxy-fuel combustion, and integrated gasification combined cycles (IGCC). Among these, post-combustion $CO_2$ capture using aqueous amine-based systems have been relied upon as the most practical short term solution due to the relatively high $CO_2/N_2$ selectivity, ability to function in the presence of water, high reactivity, and low absorbent cost. However, such amine-based systems have significant drawbacks including solvent loss, corrosion, and most importantly, intensive energy demand for regeneration.

Ionic liquids (ILs) are particularly attractive candidates for capture of carbon dioxide ($CO_2$) and other polluting gases because of their unique properties, such as low or negligible vapor pressures, wide liquid temperature ranges, generally high thermal stabilities, and tunable properties. However, current processes using ionic liquids for this purpose (typically, amino-functionalized ILs) are beset with several drawbacks. A particular problem associated with many current IL capture materials is the high viscosity generated in these ILs on absorbing $CO_2$. This substantial rise in viscosity adversely slows absorption kinetics, and hence, substantially increases operating costs. There are indications that the rise in viscosity in such ILs can be attributed to strong and dense hydrogen-bond networks during the reaction of $CO_2$ with the IL (e.g., Gutowski, K. E., et al., *J. Am. Chem. Soc.*, 2008, 130, 14690-14704). This increased viscosity hinders mass transfer, effectively slowing the sorption and desorption kinetics of the ionic liquid. Moreover, current IL materials generally possess subpar $CO_2$ absorption capacities and absorption rates for $CO_2$ capture.

SUMMARY OF THE INVENTION

In one aspect, the invention is directed to a novel ionic liquid-functionalized composite structure useful for capturing a gaseous electrophilic species, such as carbon dioxide or sulfur dioxide. The composite structure includes mesoporous refractory sorbent particles on which an ionic liquid (IL) is covalently attached, wherein the ionic liquid includes an accessible functional group capable of binding to the gaseous electrophilic species. In particular embodiments, the mesoporous refractory sorbent particles are contained within refractory hollow fibers.

In another aspect, the invention is directed to methods for capturing a gaseous electrophilic species. In the method, a gas stream (from, e.g., a power plant) containing gaseous electrophilic species is contacted with the ionic liquid-functionalized composite structure. When the gaseous electrophilic species (typically, a gaseous sample containing the electrophilic species) contacts the composite structure, the tethered ionic liquid forms an addition product with the electrophilic species. Generally, the absorption of the electrophilic gaseous species is reversible. In preferred embodiments, the method includes removing captured gaseous electrophilic species from the composite structure, and re-using the composite structure for capturing additional gaseous electrophilic species. In particular embodiments thereof, the IL-functionalized mesoporous refractory sorbent particles are contained within refractory hollow fibers or tubes, and cooling water is passed through the refractory hollow fibers to facilitate capture of the gaseous electrophilic species, and then steam is passed through the refractory hollow fibers to facilitate release of the gaseous electrophilic species.

By immobilizing the ionic liquid onto a mesoporous support, the composite structure described herein advantageously circumvents the problematic effects associated with increasing viscosity of the IL during gas absorption. The composite structure is also conveniently amenable for integration into hollow fibers or tubes, wherein the resulting tubular structure can be conveniently charged with cool gas or liquid to aid in gas adsorption, and charged with heated gas or liquid to aid in gas release.

DETAILED DESCRIPTION OF THE INVENTION

Figure 1:
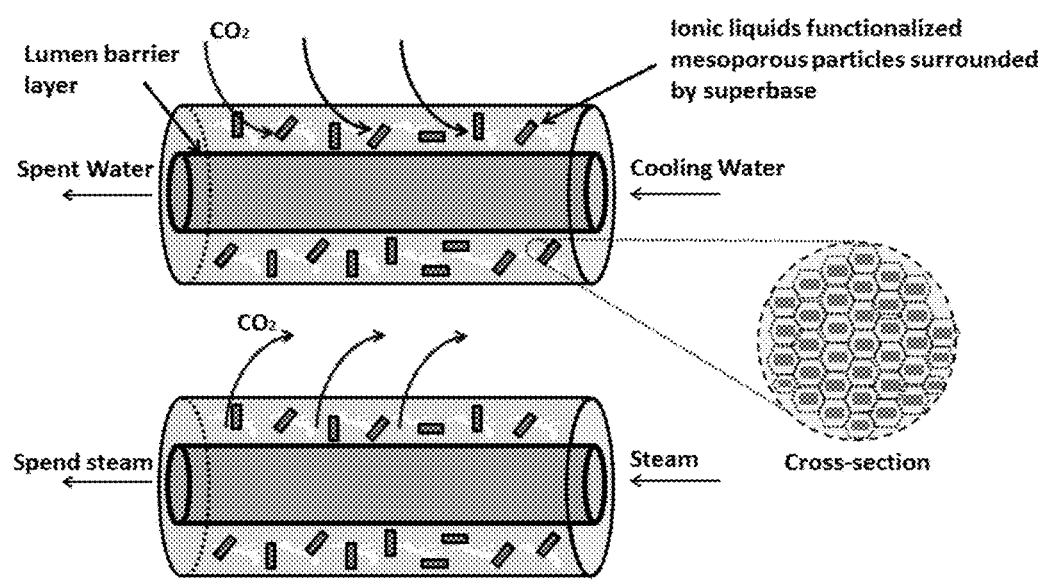
FIG. 1. Schematic of a gas capture system in which ionic liquid-functionalized sorbent particles are incorporated into refractory hollow fibers. Cooling water is passed through a bore of the hollow fibers to facilitate gas capture, and high temperature gas (e.g., steam) or a heated liquid is passed through the bore of the hollow fibers to facilitate gas release.

As used herein, the term "about" generally indicates within ±0.5%, 1%, 2%, 5%, or up to ±10% of the indicated value. For example, a temperature of about 25° C. generally indicates, in its broadest sense, 25° C.±10%, which indicates 22.5-27.5° C.

In a first aspect, the invention is directed to a composite structure for capturing a gaseous electrophilic species. The composite structure contains mesoporous refractory sorbent particles on (or into) which an ionic liquid, reactive with (i.e., by forming an adduct with) the gaseous electrophilic species, is covalently attached. The ionic liquid is reactive with the gaseous electrophilic species by possessing an accessible functional group that reacts with (i.e., binds or forms an adduct with) the gaseous electrophilic species.

Typically, the electrophilic species is a gaseous oxide compound, such as carbon dioxide ($CO_2$) and oxides of sulfur, e.g., sulfur dioxide ($SO_2$) or sulfur trioxide ($SO_3$). Other electrophilic species include, for example, carbon monoxide (CO), nitrogen dioxide ($NO_2$), and selenium dioxide ($SeO_2$). Generally, the electrophilic species considered herein is a toxic or polluting species that is desirably removed (preferably, selectively) from the environment. The electrophilic species is typically in the form of a gas; however, in some embodiments, the electrophilic species may be a liquid (or converted into or dissolved into a liquid) before contacting the ionic liquid.

By being reactive with the gaseous electrophilic species is generally meant herein that the reactive functional group nucleophilicly attacks and forms a covalent bond with an electrophilic atom of the gaseous electrophilic species, e.g., the carbon atom of carbon dioxide or the sulfur atom of sulfur dioxide. The reactive functional group can be included in the cationic portion, anionic portion, or both, of the ionic liquid. In the case of an amine reactive functional group, reaction with carbon dioxide results in a carbamate species. In the case of an alkoxide functional group, reaction with carbon dioxide results in a carbonate species.

The reactive functional group can be, for example, a primary or secondary amine (i.e., organoamine), deprotonated hydroxy (e.g., alkoxide or phenoxide), or deprotonated thiol group. In some embodiments, the reactive functional group on the ionic liquid is capable of reacting with the electrophilic gas without activation or modification of the reactive functional group. In other embodiments, the reactive functional group is in a precursor form, i.e., needs activation or modification to become suitably reactive with the electrophilic gas. For example, when used in a gas capture process, hydroxy or thiol groups on the ionic liquid are generally not suitably reactive without being deprotonated. Thus, if hydroxy or thiol groups are relied upon as the reactive functional groups in the ionic liquid, they are necessarily first deprotonated before or during the gas absorption process in order for them to react with the electrophilic gas. Other functional groups on the ionic liquid may serve as precursors to reactive functional groups. For example, an organoester group (which may or may not be activated, e.g., with N-hydroxysuccinimide) may be hydrolyzed with a base to provide an alkoxide, or may be reacted with a diamine to provide an accessible amino group. As another example, the carbon connecting ring nitrogen atoms in an imidazolium portion of an ionic liquid (i.e., the carbon at the 2-position) may be acidic enough to be deprotonated under sufficiently basic conditions to provide an anionic portion sufficiently reactive with an electrophilic gas.

A primary amine refers to the group —$NH_2$ bound to any part of the ionic liquid. In some embodiments, the primary amine may be a part of a larger heteroatomic group, e.g., a carboxamido (—C(O)$NH_2$), sulfonamido (—$SO_2NH_2$), ureido (—NR'C(O)$NH_2$), or hydrazinyl (—NR'—$NH_2$) group, wherein R' is, for example, a hydrocarbon group (as set forth below) or a hydrogen atom.

In one embodiment, a secondary amine is pendant on the ionic liquid. The pendant secondary amino group can be, for example, any group within the formula —NHR, wherein R represents a hydrocarbon group, typically up to two, three, four, five, six, seven, or eight carbon atoms, e.g., methyl, ethyl, n-propyl, isopropyl, n-butyl, isobutyl, sec-butyl, t-butyl, n-pentyl, isopentyl, neopentyl, n-hexyl, isohexyl, phenyl, benzyl, tolyl, and xylyl groups, wherein tolyl and xylyl groups may be connected via ring or methyl group atoms. In another embodiment, the secondary amine is incorporated within a straight-chained or branched portion of the ionic liquid, i.e., as a —NH— linking group. In yet another embodiment, the secondary amine is incorporated as a ring nitrogen atom in a saturated or unsaturated ring of the ionic liquid, as in, e.g., an aniline, N-methylaniline, benzamide, N-methylbenzamide, imidazole, piperidine, or oxazolidine ring, or an N-deprotonated form thereof. In some embodiments, the second amine may be a part of a larger heteroatomic group, e.g., a carboxamido (—C(O)NHR), sulfonamido (—$SO_2$NHR), ureido (—NR'C(O)NHR), or hydrazinyl (—NR'—NHR) groups, wherein R is a hydrocarbon group as set forth above, and R' is, for example, a hydrocarbon group (as set forth below) or a hydrogen atom.

The hydroxy group can be, for example, a hydroxyalkyl group (e.g., hydroxymethyl, hydroxyethyl, hydroxypropyl, hydroxybutyl, 1-hydroxy-1-ethyl, 1-hydroxyprop-1-yl, and 2-hydroxyprop-1-yl), dihydroxyalkyl group (e.g., 2,3-dihydroxypropyl-1-yl), a phenol, resorcinol, or catechol group. The thiol group can be, for example, any of the hydroxy groups provided above except that at least one hydroxy group has been replaced with a thiol group (e.g., thiomethyl, thioethyl, or thiophenol).

The ionic liquid may also include functional groups that are not reactive with the electrophilic gas, but which provide a beneficial effect, such as an improved liquid-gas phase interaction, enhanced hydrophilicity or hydrophobicity, or a positive or negative charge. The additional functional group can be, for example, one or more halogen atoms (e.g., fluorine, chlorine, bromine, and iodine atoms), and/or one or more carboxylate, sulfonate, nitro, phosphonate, ether (i.e., C—O—C), tertiary or quaternary amino group, and/or a carbon-carbon double or triple bond.

The ionic liquid considered herein is any ionic liquid (including an organic or inorganic ionic liquid) that possesses at least one accessible reactive functional group when bound to the refractory sorbent particles. As understood in the art, an ionic liquid is a salt compound that is liquid and includes a cationic component and an anionic component. The ionic liquid can be of the formula $Y^+X^-$, wherein $Y^+$ is a cationic component of the ionic liquid and $X^-$ is an anionic component of the ionic liquid. The formula $(Y^+)(X^-)$ is meant to encompass a cationic component ($Y^+$) having any valency of positive charge, and an anionic component ($X^-$) having any valency of negative charge, provided that the charge contributions from the cationic portion and anionic portion are counterbalanced in order for charge neutrality to be preserved in the ionic liquid molecule.

The ionic liquid is typically a liquid at room temperature (e.g., 15, 18, 20, 22, 25, or 30° C.) or lower. However, in some embodiments, the ionic liquid may become a liquid at a higher temperature than 30° C. if the process is conducted at an elevated water temperature (i.e., up to the boiling point of water, or 100° C.) that melts the ionic liquid. Thus, in some embodiments, the ionic liquid may have a melting point of up to or less than 100, 90, 80, 70, 60, 50, 40, or 30° C. In other embodiments, the ionic liquid is a liquid at or below 10, 5, 0, −10, −20, −30, or −40° C.

The ionic liquids considered herein preferably possess a suitable degree of thermal resilience, as typically reflected by the onset decomposition temperature, to ensure their stability for use in the applications described herein. In different embodiments, the ionic liquid preferably exhibits an onset decomposition temperature of at least 100, 150, 200, 250, 300, 350, 400, 450, 500, 525, 550, 575, or 600° C.

In one set of embodiments, the ionic liquid possesses an ammonium cation portion. In a first embodiment, the ammonium cation portion includes a heterocyclic ring having a positively-charged ring nitrogen atom. The heterocyclic ring having a positively-charged ring nitrogen atom can be monocyclic, bicyclic, tricyclic, or a higher cyclic (polycyclic) ring system. Some examples of a heterocyclic ring having a positively-charged ring nitrogen atom include imidazolium, pyridinium, pyrazinium, pyrrolidinium, piperidinium, piperazinium, morpholinium, pyrrolium, pyrazolium, pyrimidinium, triazolium, oxazolium, thiazolium, triazinium, and cyclic guanidinium rings. Any of the foregoing cationic rings may be bound or fused with one or more other saturated or unsaturated (e.g., aromatic) rings, such as a benzene, cyclohexane, cyclohexene, pyridine, pyrazine, pyrrolidine, piperidine, piperazine, pyrrole, pyrazole, pyrimidine, or indole rings. Some examples of fused charged rings include benzimidazolium, pyrrolo[1,2-a]pyrimidinium, indolium, quinolinium, quinazolinium, quinoxalinium, 5,6,7,8-tetrahydroimidazo[1,2-a]pyridine, and H-imidazo[1,2-a]pyridine. Any of the foregoing cationic rings may be substituted by one or more hydrocarbon groups (R) as further described below. Typically, at least one ring nitrogen atom is substituted with a hydrocarbon group (R) to provide the positive charge. Ionic liquids containing any of the foregoing cationic components are either commercially available or can be synthesized by procedures well-known in the art, as evidenced by, for example, T. L. Greaves, et al., "Protic Ionic Liquids: Properties and Applications", *Chem. Rev.*, 108, pp. 206-237 (2008), the contents of which are herein incorporated by reference in their entirety. Any of the ionic liquids described in the foregoing reference may be used herein.

In one embodiment, the ammonium ionic liquid is an imidazolium-based ionic liquid having a structure of the general formula:

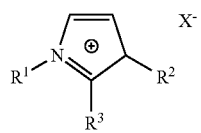

(1)

In Formula (1) above, $R^1$, $R^2$ and $R^3$ are each independently a saturated or unsaturated, straight-chained, branched, or cyclic hydrocarbon group (R), as further described below, having at least one carbon atom, and $X^-$ is a counteranion, as further described infra. In some embodiments, $R^1$ and $R^2$, or $R^1$ and $R^3$, or $R^1$ and $R^3$ are different in structure or number of carbon atoms, whereas in other embodiments, $R^1$ and $R^2$, or $R^1$ and $R^3$, or $R^2$ and $R^3$ are the same either in structure or number of carbon atoms. In different embodiments, $R^1$, $R^2$ and $R^3$ each independently have a minimum of at least one, two, three, four, five, six, seven, or eight carbon atoms. In other embodiments, $R^1$, $R^2$ and $R^3$ each independently have a maximum of two, three, four, five, six, seven, eight, nine, ten, eleven, twelve, thirteen, fourteen, fifteen, sixteen, seventeen, or eighteen carbon atoms. In other embodiments, $R^1$, $R^2$ and $R^3$ independently have a number of carbon atoms within a range of carbon atoms bounded by any of the exemplary minimum and maximum carbon numbers provided above. As the double bonds shown in Formula (1) are generally delocalized, other structurally equivalent depictions may be possible for the imidazolium ring.

In a first embodiment, one, two, or all of $R^1$, $R^2$ and $R^3$ are saturated and straight-chained hydrocarbon groups (i.e., straight-chained alkyl groups). Some examples of straight-chained alkyl groups include methyl, ethyl, n-propyl, n-butyl, n-pentyl, n-hexyl, n-heptyl, n-octyl, n-nonyl, n-decyl, n-undecyl, n-dodecyl, n-tridecyl, n-tetradecyl, n-pentadecyl, n-hexadecyl, n-heptadecyl, and n-octadecyl groups.

In a second embodiment, one, two, or all of $R^1$, $R^2$ and $R^3$ are saturated and branched hydrocarbon groups (i.e., branched alkyl groups). Some examples of branched alkyl groups include isopropyl, isobutyl, sec-butyl, t-butyl, isopentyl, neopentyl, 2-methylpentyl, 3-methylpentyl, and the numerous $C_7$, $C_8$, $C_9$, $C_{10}$, $C_{11}$, $C_{12}$, $C_{13}$, $C_{14}$, $C_{15}$, $C_{16}$, $C_{17}$, and $C_{18}$ saturated and branched hydrocarbon groups.

In a third embodiment, one, two, or all of $R^1$, $R^2$ and $R^3$ are saturated and cyclic hydrocarbon groups (i.e., cycloalkyl groups). Some examples of cycloalkyl groups include cyclopropyl, cyclobutyl, cyclopentyl, cyclohexyl, cycloheptyl, cyclooctyl, and their methyl-, ethyl-, and propyl-substituted derivatives and/or their methylene, dimethylene, trimethylene, and tetramethylene cross-linked derivatives (as crosslinked to a nitrogen atom of the imidazolium ring). The cycloalkyl group can also be a polycyclic (e.g., bicyclic or tricyclic) group by either possessing a bond between two of the ring groups (e.g., dicyclohexyl) or a shared (i.e., fused) side (e.g., decalin and norbornane).

In a fourth embodiment, one, two, or all of $R^1$, $R^2$ and $R^3$ are unsaturated and straight-chained hydrocarbon groups (i.e., straight-chained olefinic or alkenyl groups). Some examples of straight-chained olefinic groups include vinyl, 2-propen-1-yl, 3-buten-1-yl, 2-buten-1-yl, butadienyl, 4-penten-1-yl, 3-penten-1-yl, 2-penten-1-yl, 2,4-pentadien-1-yl, 5-hexen-1-yl, 4-hexen-1-yl, 3-hexen-1-yl, 3,5-hexadien-1-yl, 1,3,5-hexatrien-1-yl, 6-hepten-1-yl, ethynyl, propargyl, and the numerous $C_7$, $C_8$, $C_9$, $C_{10}$, $C_{11}$, $C_{12}$, $C_{13}$, $C_{14}$, $C_{15}$, $C_{16}$, $C_{17}$, and $C_{18}$ unsaturated and straight-chained hydrocarbon groups.

In a fifth embodiment, one, two, or all of $R^1$, $R^2$ and $R^3$ are unsaturated and branched hydrocarbon groups (i.e., branched olefinic or alkenyl groups). Some branched olefinic groups include 2-propen-2-yl, 3-buten-2-yl, 3-buten-3-yl, 4-penten-2-yl, 4-penten-3-yl, 3-penten-2-yl, 3-penten-3-yl, 2,4-pentadien-3-yl, and the numerous $C_6$, $C_7$, $C_8$, $C_9$, $C_{10}$, $C_{11}$, $C_{12}$, $C_{13}$, $C_{14}$, $C_{15}$, $C_{16}$, $C_{17}$, and $C_{18}$ unsaturated and branched hydrocarbon groups.

In a sixth embodiment, one, two, or all of $R^1$, $R^2$ and $R^3$ are unsaturated and cyclic hydrocarbon groups. Some examples of unsaturated and cyclic hydrocarbon groups include cyclopropenyl, cyclobutenyl, cyclopentenyl, cyclopentadienyl, cyclohexenyl, cyclohexadienyl, phenyl, benzyl, cycloheptenyl, cycloheptadienyl, cyclooctenyl, cyclooctadienyl, cyclooctatetraenyl, and their methyl-, ethyl-, and propyl-substituted derivatives and/or their methylene, dimethylene, trimethylene, and tetramethylene cross-linked derivatives (as crosslinked to a nitrogen atom of the imidazolium ring). The unsaturated cyclic hydrocarbon group can also be a polycyclic (e.g., bicyclic or tricyclic) group by either possessing a bond between two of the ring groups (e.g., biphenyl) or a shared (i.e., fused) side (e.g., naphthalene, anthracene, and phenanthrene).

In one embodiment, as in the examples above, one or more of the hydrocarbon groups (R), described above, are composed solely of carbon and hydrogen, i.e., do not include one or more heteroatoms, such as oxygen or nitrogen atoms. In another embodiment, one or more of the hydrocarbon groups include one or more heteroatoms, such as one or more oxygen, nitrogen, and/or fluorine atoms. Some examples of oxygen-containing hydrocarbon groups include those possessing one or more hydroxyl (OH) groups, alkoxide (—OR), carbonyl groups (e.g., ketone, ester, amide, or urea functionalities), amino (e.g., —$NH_2$, —NHR, and —$NR_2$), imino (e.g., =N—, =N—H or =N—R groups), and/or carbon-oxygen-carbon (ether) groups. In a particular embodiment, the oxygen-containing hydrocarbon group includes two or more ether groups, such as a polyalkyleneoxide group, such as a polyethyleneoxide group. Some examples of nitrogen-containing hydrocarbon groups include those possessing one or more primary amine groups, secondary amine groups, tertiary amine groups, and/or quaternary amine groups, wherein it is understood that a quaternary amine group necessarily possesses a positive charge and requires a counteranion. Some examples of fluorine-containing hydrocarbon groups (i.e., fluorocarbon groups) include the partially-substituted varieties (e.g., fluoromethyl, difluoromethyl, 2-fluoroethyl, 2,2-difluoroethyl, 2,2,2-trifluoroethyl, and the like) and perfluoro-substituted varieties (e.g., perfluoromethyl, perfluoroethyl, perfluoropropyl, perfluorobutyl, and the like). In some embodiments, any one or more of the foregoing exemplary heteroatoms or heteroatom-containing substituents may be excluded from Formula (1) or from any of the cationic and/or anionic portions of the ionic liquids described herein.

The ionic liquids according to Formula (1) can contain any of the above-described imidazolium-based cationic components associated (i.e., complexed) with counteranions $X^-$ further described infra. Some general examples of imidazolium-based ionic liquids according to Formula (1) include 1,3-dimethylimidazolium$^+X^-$, 1,2,3-trimethylimidazolium$^+X^-$, 2-ethyl-1,3-dimethylimidazolium$^+X^-$, 2-n-propyl-1,3-dimethylimidazolium$^+X^-$, 2-n-butyl-1,3-dimethylimidazolium$^+X^-$, 1-ethyl-2,3-dimethylimidazolium$^+X^+$, 1-n-propyl-2,3-dimethylimidazolium$^+X^-$, 1-n-butyl-2,3-dimethylimidazolium$^+X^-$, 1-methyl-3-ethylimidazolium$^+X^-$, 1-methyl-3-n-propylimidazolium$^+X^+$, 1-methyl-3-isopropylimidazolium$^+X^-$, 1-methyl-3-n-butylimidazolium$^+X^-$ (i.e., BMIM$^+X^-$), 1-methyl-3-isobutylimidazolium$^+X^-$, 1-methyl-3-sec-butylimidazolium$^+X^-$, 1-methyl-3-t-butylimidazolium$^+X^-$, 1,3-diethylimidazolium$^+X^-$, 1-ethyl-3-n-propylimidazolium$^+X^-$, 1-ethyl-3-isopropylimidazolium$^+X^-$, 1-ethyl-3-n-butylimidazolium$^+X^-$, 1-ethyl-3-isobutylimidazolium$^+X^-$, 1-ethyl-3-sec-butylimidazolium$^+X^-$, 1-ethyl-3-t-butylimidazolium$^+X^-$, 1,3-di-n-propylimidazolium$^+X^-$, 1-n-propyl-3-isopropylimidazolium$^+X^-$, 1-n-propyl-3-n-butylimidazolium$^+X^-$, 1-n-propyl-3-isobutylimidazolium$^+X^-$, 1-n-propyl-3-sec-butylimidazolium$^+X^-$, 1-n-propyl-3-t-butylimidazolium$^+X^-$, 1,3-diisopropylimidazolium$^+X^-$, 1-isopropyl-3-n-butylimidazolium$^+X^-$, 1-isopropyl-3-isobutylimidazolium$^+X^-$, 1-isopropyl-3-sec-butylimidazolium$^+X^-$, 1-isopropyl-3-t-butylimidazolium$^+X^-$, 1,3-di-n-butylimidazolium$^+X^-$, 1-n-butyl-3-isobutylimidazolium$^+X^-$, 1-n-butyl-3-sec-butylimidazolium$^+X^-$, 1-n-butyl-3-t-butylimidazolium$^+X^-$, 1,3-diisobutylimidazolium$^+X^-$, 1-isobutyl-3-sec-butylimidazolium$^+X^-$, 1-isobutyl-3-t-butylimidazolium$^+X^-$, 1,3-di-sec-butylimidazolium$^+X^-$, 1-sec-butyl-3-t-butylimidazolium$^+X^-$, 1,3-di-t-butylimidazolium$^+X^-$, 1-methyl-3-pentylimidazolium$^+X^-$, 1-methyl-3-hexylimidazolium$^+X^-$, 1-methyl-3-heptylimidazolium$^+X^-$, 1-methyl-3-octylimidazolium$^+X^-$, 1-methyl-3-decylimidazolium$^+X^-$, 1-methyl-3-dodecylimidazolium$^+X^-$, 1-methyl-3-tetradecylimidazolium$^+X^-$, 1-methyl-3-hexadecylimidazolium$^+X^-$, 1-methyl-3-octadecylimidazolium$^+X^-$, 1-(2-hydroxyethyl)-3-methylimidazolium$^+X^-$, and 1-allyl-3-methylimidazolium$^+X^-$.

In Formula (1), one or both of the hydrogen atoms at the 4- and 5-positions may also be substituted with a group, such as a hydrocarbon group, such as any of the hydrocarbon groups described above, an alkoxide group (—OR), hydroxy group (OH), amino group (—$NH_2$, —NHR, or —$NR_2$), carboxamide group (—C(O)$NR_2$ wherein one or both R groups can be replaced with H), and/or halogen atom (e.g., F, Cl, Br, or I atom), wherein the R groups may be the same or different and may or may not be interconnected to form a ring. For example, one or both of the 4- and 5-positions of the imidazole ring may be substituted with a methyl, ethyl, n-propyl, isopropyl, n-butyl, isobutyl, sec-butyl, or t-butyl group. $R^3$ at the 2-position may also be selected from any of the foregoing groups provided for the 4- and 5-positions. Moreover, any one or more of $R^1$, $R^2$ and $R^3$ may or may not also include an imidazole or imidazolium ring, which therefore may result in a bi-imidazolium, tri-imidazolium, or tetra-imidazolium cationic portion.

In some embodiments of Formula (1), $R^1$ and $R^3$, or $R^2$ and $R^3$ are interconnected, thereby forming an imidazolyl-containing bicyclic ring system. The interconnection can be saturated or unsaturated, and may or may not include substituting groups, as described above for the hydrocarbon groups R provided above. Some examples of ionic liquids containing such imidazolyl-containing bicyclic ring systems include those according to the following formulas:

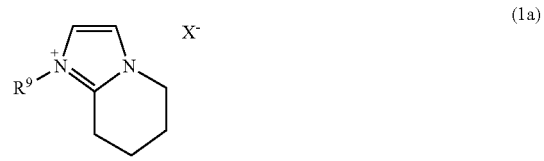

(1a)

(1b)

In Formulas (1a) and (1b), $R^9$ and $R^{10}$ independently represent a hydrocarbon group, with or without heteroatom substitution, such as any of the hydrocarbon groups (R) described above for $R^1$, $R^2$ and $R^3$ of Formula (1). In particular embodiments, $R^9$ and $R^{10}$ are independently selected from methyl, ethyl, n-propyl, isopropyl, n-butyl, isobutyl, sec-butyl, t-butyl, n-pentyl, isopentyl, neopentyl, n-hexyl, isohexyl, vinyl, and allyl groups. Any of the hydrogen atoms at available carbon atoms in Formulas (1a) and (1b) may be substituted with a group, such as a hydrocarbon group, such as any of the hydrocarbon groups (R) described above, an alkoxide group (—OR), hydroxy group (OH), amino group (—$NH_2$, —NHR, or —$NR_2$), carboxamide group (—C(O)$NR_2$ wherein one or both R groups can be replaced with H), and/or halogen atom (e.g., F, Cl, Br, or I atom), wherein the R groups may be the same or different and may or may not be interconnected to form a ring.

In another embodiment, the ammonium ionic liquid is an N-hydrocarbylpyridinium-based ionic liquid having a structure of the general formula:

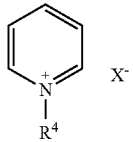
(2)

In Formula (2), $R^4$ represents a hydrocarbon group, with or without heteroatom substitution, such as any of the hydrocarbon groups (R) described above for $R^1$, $R^2$ and $R^3$ of Formula (1), and the counteranion $X^-$ can be any counteranion, such as those further described infra. Some general examples of N-alkylpyridinium-based ionic liquids include N-methylpyridinium$^+$X$^-$, N-ethylpyridinium$^+$X$^-$, N-n-propylpyridinium$^+$X$^-$, N-isopropylpyridinium$^+$X$^-$, N-n-butylpyridinium$^+$X$^-$, N-isobutylpyridinium$^+$X$^-$, N-sec-butylpyridinium$^+$X$^-$, N-t-butylpyridinium$^+$X$^-$, N-n-pentylpyridinium$^+$X$^-$, N-isopentylpyridinium$^+$X$^-$, N-neopentylpyridinium$^+$X$^-$, N-n-hexylpyridinium$^+$X$^-$, N-n-heptylpyridinium$^+$X$^-$, N-n-octylpyridinium$^+$X$^-$, N-n-nonylpyridinium$^+$X$^-$, N-n-decylpyridinium$^+$X$^-$, N-n-undecylpyridinium$^+$X$^-$, N-n-dodecylpyridinium$^+$X$^-$, N-n-tridecylpyridinium$^+$X$^-$, N-n-tetradecylpyridinium$^+$X$^-$, N-n-pentadecylpyridinium$^+$X$^-$, N-n-hexadecylpyridinium$^+$X$^-$, N-n-heptadecylpyridinium$^+$X$^-$, N-n-octadecylpyridinium$^+$X$^-$, N-vinylpyridinium$^+$X$^-$, N-allylpyridinium$^+$X$^-$, N-phenylpyridinium$^+$X$^-$, N-(2-hydroxyethyl)pyridinium$^+$X$^-$, N-benzylpyridinium$^+$X$^-$, and N-phenethylpyridinium$^+$X$^-$.

In Formula (2), any one or more of the hydrogen atoms on the ring carbon atoms can be substituted with one or more other groups, such as a hydrocarbon group (R), alkoxide group (—OR), hydroxy group (OH), amino group (—NH$_2$, —NHR, or —NR$_2$), carboxamide group (—C(O)NR$_2$ wherein one or both R groups can be replaced with H), and/or halogen atom (e.g., F, Cl, Br, or I atom), wherein the R groups may be the same or different and may or may not be interconnected to form a ring. Some examples of such ionic liquids include N-methyl-4-methylpyridinium X$^-$, N-ethyl-4-methylpyridinium X$^-$, N-methyl-4-ethylpyridinium X$^-$, N-methyl-4-isopropylpyridinium X$^-$, N-isopropyl-4-methylpyridinium X$^-$, and N-octyl-4-methylpyridinium X. Moreover, any one or two of the ring carbon atoms ortho, meta, or para to the shown ring nitrogen atom in the pyridinium ring may be replaced with a respective number of ring nitrogen atoms, which may be neutral or positively charged ring nitrogen atoms.

In another embodiment, the ammonium ionic liquid is a quaternary ammonium ionic liquid having a structure of the general formula:

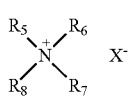
(3)

In Formula (3), $R^5$, $R^6$, $R^7$, and $R^8$ independently represent a hydrocarbon group, with or without heteroatom substitution, such as any of the hydrocarbon groups (R) described above for $R^1$, $R^2$ and $R^3$ of Formula (1), or a hydrogen atom, wherein at least one of $R^5$, $R^6$, $R^7$, and $R^8$ represents a hydrocarbon group (with or without heteroatom substitution), and the counteranion $X^-$ can be any counteranion, such as those described infra. In one embodiment, one of $R^5$, $R^6$, $R^7$, and $R^8$ is a hydrocarbon group while the rest are hydrogen atoms. In another embodiment, two of $R^5$, $R^6$, $R^7$, and $R^8$ are hydrocarbon groups while two are hydrogen atoms. In another embodiment, three of $R^5$, $R^6$, $R^7$, and $R^8$ are hydrocarbon groups while one is a hydrogen atom. In another embodiment, all of $R^5$, $R^6$, $R^7$, and $R^8$ are hydrocarbon groups (or more specifically, alkyl groups), thereby resulting in a tetrahydrocarbylammonium group (or more specifically, a tetraalkylammonium group). Some general examples of quaternary ammonium ionic liquids include methylammonium$^+$X$^-$, dimethylammonium$^+$X$^-$, trimethylammonium$^+$X$^-$, tetramethylammonium$^+$X$^-$, ethylammonium$^+$X$^-$, ethyltrimethylammonium$^+$X$^-$, diethylammonium$^+$X$^-$, triethylammonium$^+$X$^-$, tetraethylammonium$^+$X$^-$, n-propylammonium$^+$X$^-$, n-propyltrimethylammonium$^+$X$^-$, isopropylammonium$^+$X$^-$, n-butylammonium$^+$X$^-$, n-butyltrimethylammonium$^+$X$^-$, n-butylmethylammonium$^+$X$^-$, di-(n-butyl)dimethylammonium$^+$X$^-$, tri-(n-butyl)methylammonium$^+$X$^-$, n-pentylammonium$^+$X$^-$, n-pentyltrimethylammonium$^+$X$^-$, tri-(n-pentyl)methylammonium$^+$X$^-$, n-hexylammonium$^+$X$^-$, n-hexyltrimethylammonium$^+$X$^-$, tri-(n-hexyl)methylammonium$^+$X$^-$, n-heptylammonium$^+$X$^-$, n-heptyltrimethylammonium$^+$X$^-$, tri-(n-heptyl)methylammonium$^+$X$^-$, n-octylammonium$^+$X$^-$, n-octyltrimethylammonium$^+$X$^-$, tri-(n-octyl)methylammonium$^+$X$^-$, benzyltrimethylammonium$^+$X$^-$, choline$^+$X$^-$, 2-hydroxyethylammonium$^+$X$^-$, allylammonium$^+$allyltrimethylammonium$^+$X$^-$, [(2-methacryloxy)ethyl]-trimethylammonium$^+$X$^-$, and (4-vinylbenzyl)trimethylammonium$^+$X$^-$.

In another embodiment, the ammonium ionic liquid is a cyclic guanidinium-based ionic liquid. The cyclic guanidinium-based ionic liquid can have any of the structures known in the art, including those described in U.S. Pat. No. 8,129,543 and M. G. Bogdanov, et al., Z. Naturforsch, 65b, pp. 37-48, 2010, the contents of which are herein incorporated by reference in their entirety.

The cyclic guanidinium-based ionic liquid can be described by the following general formula:

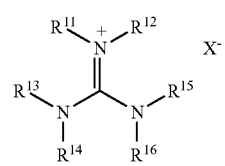
(4)

In Formula (4) above, $R^{11}$, $R^{12}$, $R^{13}$, $R^{14}$, $R^{15}$, and/or $R^{16}$ groups independently represent a hydrocarbon group, with or without heteroatom substitution, such as any of the hydrocarbon groups (R) described above for $R^1$, $R^2$ and $R^3$ of Formula (1), or a hydrogen atom, provided that at least two of $R^{11}$, $R^{12}$, $R^{13}$, $R^{14}$, $R^{15}$, and $R^{16}$ are interconnected to form a ring or a bicyclic, tricylic, or higher cyclic ring system. In some embodiments, $R^{11}$, $R^{12}$, $R^{13}$, $R^{14}$, $R^{15}$, and/or $R^{16}$ groups are independently selected from methyl, ethyl, n-propyl, isopropyl, n-butyl, isobutyl, sec-butyl, t-butyl, n-pentyl, isopentyl, neopentyl, n-hexyl, isohexyl, vinyl, and allyl groups, provided that at least two of $R^{11}$, $R^{12}$, $R^{13}$, $R^{14}$, $R^{15}$, and $R^{16}$ are interconnected to form a ring or a bicyclic, tricylic, or higher cyclic ring system. In a first set of embodiments, $R^{11}$ and $R^{12}$ are interconnected. In a second set of embodiments, $R^{13}$ and $R^{14}$, or $R^{15}$ and $R^{16}$, are interconnected. In a third set of embodiments, $R^{11}$ and $R^{13}$, or $R^{12}$ and $R^{15}$, are interconnected. In a fourth set of embodiments, $R^{14}$ and $R^{16}$ are interconnected. In other embodiments, any two or three of the foregoing types of interconnections are combined. The foregoing embodiments also include the possibility that all of $R^{11}$, $R^{12}$, $R^{13}$, $R^{14}$, $R^{15}$, and $R^{16}$ groups are engaged in an interconnection. The counteranion $X^-$ can be any counteranion, such as those described infra.

In particular embodiments, the cyclic guanidinium-based ionic liquid has a structure of any of the following general formulas:

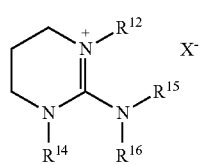

(4a)

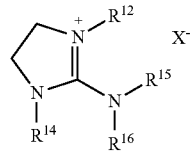

(4b)

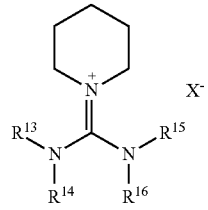

(4c)

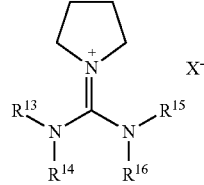

(4d)

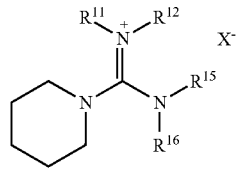

(4e)

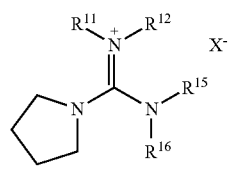

(4f)

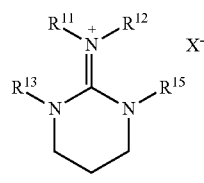

(4g)

-continued

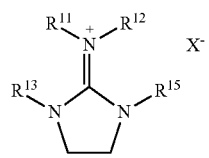

(4h)

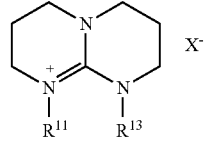

(4i)

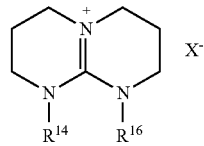

(4j)

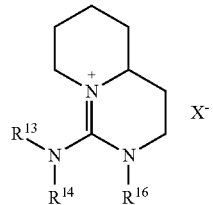

(4k)

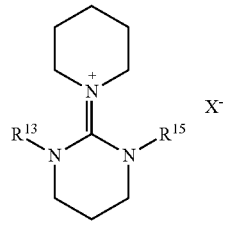

(4l)

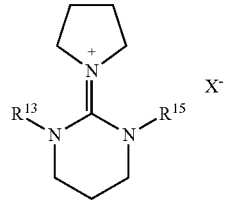

(4m)

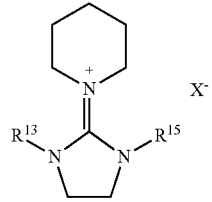

(4n)

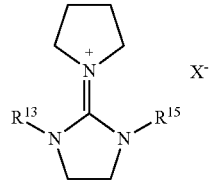

(4p)

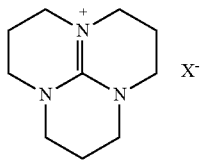

(4q)

In some embodiments, any of the cyclic guanidinium structures shown in Formulas (4a)-(4q) may have a ring carbon atom replaced with a heteroatom selected from oxygen (O), sulfur (S), and/or nitrogen (—NR—). Moreover, any of the hydrogen atoms residing on ring carbon atoms may be substituted with one or more other groups, such as a hydrocarbon group (R), alkoxide group (—OR), hydroxy group (OH), amino group (—$NH_2$, —NHR, or —$NR_2$), carboxamide group (—C(O)$NR_2$ wherein one or both R groups can be replaced with H), and/or halogen atom (e.g., F, Cl, Br, or I atom), wherein the R groups may be the same or different and may or may not be interconnected to form a ring.

In another embodiment, the ammonium ionic liquid is a piperidinium-based ionic liquid having a structure of the following general formula:

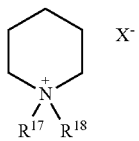

(5)

In Formula (5), $R^{17}$ and $R^{18}$ independently represent a hydrocarbon group, with or without heteroatom substitution, such as any of the hydrocarbon groups (R) described above for $R^1$, $R^2$ and $R^3$ of Formula (1), and the counteranion $X^-$ can be any of the counteranions described infra. Some examples of piperidinium-based ionic liquids include 1,1-dimethylpiperidinium$^+X^-$, 1-methyl-1-ethylpiperidinium$^+X^-$, 1-methyl-1-propylpiperidinium$^+X^-$, 1-methyl-1-butylpiperidinium$^+X^-$, 1-methyl-1-isobutylpiperidinium$^+X^-$, 1-methyl-1-pentylpiperidinium$^+X^-$, 1-methyl-1-hexylpiperidinium$^+X^-$, 1-methyl-1-heptylpiperidinium$^+X^-$, 1-methyl-1-octylpiperidinium$^+X^-$, 1-methyl-1-decylpiperidinium$^+X^-$, 1-methyl-1-dodecylpiperidinium$^+X^-$, 1-methyl-1-tetradecylpiperidinium$^+X^-$, 1-methyl-1-hexadecylpiperidinium$^+X^-$, 1-methyl-1-octadecylpiperidinium$^+X^-$, 1,1-diethylpiperidinium$^+X^-$, 1,1-dipropylpiperidinium$^+X^-$, 1,1-dibutylpiperidinium$^+X^-$, and 1,1-diisobutylpiperidinium$^+X^-$. In some embodiments, the piperidinium ring shown in Formula (5) may have a ring carbon atom replaced with a heteroatom selected from oxygen (O), sulfur (S), and/or nitrogen (—NR—). Moreover, any of the hydrogen atoms residing on ring carbon atoms may be substituted with one or more other groups, such as a hydrocarbon group (R), alkoxide group (—OR), hydroxy group (OH), amino group (—$NH_2$, —NHR, or —$NR_2$), carboxamide group (—C(O)$NR_2$ wherein one or both R groups can be replaced with H), and/or halogen atom (e.g., F, Cl, Br, or I atom), wherein the R groups may be the same or different and may or may not be interconnected to form a ring.

In another embodiment, the ammonium ionic liquid is a pyrrolidinium-based ionic liquid having a structure of the following general formula:

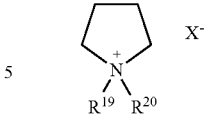

(6)

In Formula (6), $R^{19}$ and $R^{20}$ independently represent a hydrocarbon group, with or without heteroatom substitution, such as any of the hydrocarbon groups (R) described above for $R^1$, $R^2$ and $R^3$ of Formula (1), and the counteranion $X^-$ can be any of the counteranions described infra. Some examples of pyrrolidinium-based ionic liquids include 1,1-dimethylpyrrolidinium$^+X^-$, 1-methyl-1-ethylpyrrolidinium$^+X^-$, 1-methyl-1-propylpyrrolidinium$^+X^-$, 1-methyl-1-butylpyrrolidinium$^+X^-$, 1-methyl-1-isobutylpyrrolidinium$^+X^-$, 1-methyl-1-pentylpyrrolidinium$^+X^-$, 1-methyl-1-hexylpyrrolidinium$^+X^-$, 1-methyl-1-heptylpyrrolidinium$^+X^-$, 1-methyl-1-octylpyrrolidinium$^+X^-$, 1-methyl-1-decylpyrrolidinium$^+X^-$, 1-methyl-1-dodecylpyrrolidinium$^+X^-$, 1-methyl-1-tetradecylpyrrolidinium$^+X^-$, 1-methyl-1-hexadecylpyrrolidinium$^+X^-$, 1-methyl-1-octadecylpyrrolidinium$^+X^-$, 1,1-diethylpyrrolidinium$^+X^-$, 1,1-dipropylpyrrolidinium$^+X^-$, 1,1-dibutylpyrrolidinium$^+X^-$, and 1,1-diisobutylpyrrolidinium$^+X^-$. In some embodiments, the pyrrolidinium ring shown in Formula (6) may have a ring carbon atom replaced with a heteroatom selected from oxygen (O), sulfur (S), and/or nitrogen (—NR—). Moreover, any of the hydrogen atoms residing on ring carbon atoms may be substituted with one or more other groups, such as a hydrocarbon group (R), alkoxide group (—OR), hydroxy group (OH), amino group (—$NH_2$, —NHR, or —$NR_2$), carboxamide group (—C(O)$NR_2$ wherein one or both R groups can be replaced with H), and/or halogen atom (e.g., F, Cl, Br, or I atom), wherein the R groups may be the same or different and may or may not be interconnected to form a ring.

In other aspects, the ionic liquid is a phosphonium-based ionic liquid. The phosphonium-based ionic liquid can have a structure of the following general formula:

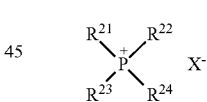

(7)

In Formula (7), $R^{21}$, $R^{22}$, $R^{23}$, and $R^{24}$ independently represent a hydrocarbon group, with or without heteroatom substitution, such as any of the hydrocarbon groups (R) described above for $R^1$, $R^2$ and $R^3$ of Formula (1), and the counteranion $X^-$ can be any of the counteranions described infra. Some general examples of phosphonium-based ionic liquids include tetramethylphosphonium$^+X^-$, tetraethylphosphonium$^+X^-$, tetrapropylphosphonium$^+X^-$, tetrabutylphosphonium$^+X^-$, tetrapentylphosphonium$^+X^-$, tetrahexylphosphonium$^+X^-$, tetraheptylphosphonium$^+X^-$, tetraoctylphosphonium$^+X^-$, tetranonylphosphonium$^+X^-$, tetradecylphosphonium$^+X^-$, tetraphenylphosphonium$^+X^-$, tetrabenzylphosphonium$^+X^-$, ethyltrimethylphosphonium$^+X^-$, n-propyltrimethylphosphonium$^+X^-$, butyltrimethylphosphonium$^+X^-$, dibutyldimethylphosphonium$^+X^-$, tributylmethylphosphonium$^+X^-$, butyltriethylphosphonium$^+X^-$, dibutyldiethylphosphonium$^+X^-$, tributylethylphosphonium$^+X^-$, triisobutylmethylphosphonium$^+X^-$, tributylhexylphosphonium$^+X^-$, tributylheptylphosphonium$^+X^-$, tributyloctylphosphonium+X−, tributyldecylphosphonium+X−, tributyldodecylphosphonium+X−, tributyltetradecylphosphonium+X−, tributylhexadecylphosphonium+X−, hexyltrimethylphosphonium+X−, dihexyldimethylphosphonium+X−, trihexylmethylphosphonium+X−, hexyltriethylphosphonium+X−, trihexyloctylphosphonium+X−, trihexyldecylphosphonium+X−, trihexyldodecylphosphonium+X−, trihexyltetradecylphosphonium+X−, trihexylhexadecylphosphonium+X−, oetyltrimethylphosphonium+X−, dioctyldimethylphosphonium+X−, trioctylmethylphosphonium+X−, octyltriethylphosphonium+X−, trioctyldecylphosphonium+X−, trioctyldodecylphosphonium+X−, trioctyltetradecylphosphonium+X−, trioctylhexadecylphosphonium+X−, tridecylmethylphosphonium+X−, phenyltrimethylphosphonium+X−, phenyttriethylphosphonium+X−, phenyltripropylphosphonium+X−, phenyltributylphosphonium+X−, diphenyldimethylphosphonium+X−, triphenylmethylphosphonium+X−, and benzyltrimethylphosphonium+X−.

In some embodiments of Formula (7), two or three of $R^{21}$, $R^{22}$, $R^{23}$, and $R^{24}$ are interconnected to form a phosphonium-containing ring or bicyclic ring system. Some general examples of phosphonium ionic liquids containing a phosphorus-containing ring or bicyclic ring system are provided by the following formulas:

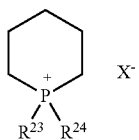

(7a)

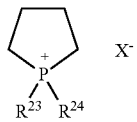

(7b)

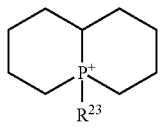

(7c)

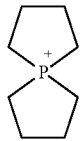

(7d)

In some embodiments, the cyclic phosphonium ring shown in any of Formulas (7a)-(7d) may have a ring carbon atom replaced with a heteroatom selected from oxygen (O), sulfur (S), and/or nitrogen (—NR—). Moreover, any of the hydrogen atoms residing on ring carbon atoms may be substituted with one or more other groups, such as a hydrocarbon group (R), alkoxide group (—OR), hydroxy group (OH), amino group (—NH$_2$, —NHR, or —NR$_2$), carboxamide group (—C(O)NR$_2$ wherein one or both R groups can be replaced with H), and/or halogen atom (e.g., F, Cl, Br, or I atom), wherein the R groups may be the same or different and may or may not be interconnected to form a ring. Any of the phosphonium cationic portions shown in any of Formulas (7) and (7a)-(7d) may also include one or more substituents containing another neutral or charged phosphorus atom, such that the phosphonium ionic liquid may be a diphosphonium or triphosphonium ionic liquid, as derived from, for example, 1,2-bis(diphenylphosphino)ethane (dppe) by appropriate alkylation.

In other aspects, the ionic liquid is a sulfonium-based ionic liquid. The sulfonium-based ionic liquid can have a structure of the following general formula:

(8)

In Formula (8), $R^{25}$, $R^{26}$, and $R^{27}$ independently represent a hydrocarbon group, with or without heteroatom substitution, such as any of the hydrocarbon groups (R) described above for $R^1$, $R^2$ and $R^3$ of Formula (1), and the counteranion X− can be any of the counteranions described infra. Some general examples of sulfonium-based ionic liquids include trimethylsulfonium+X−, dimethylethylsulfonium+X−, diethylmethylsulfonium+X−, triethylsulfonium+X−, dimethylpropylsulfonium+X−, dipropylmethylsulfonium+X−, tripropylsulfonium+X−, dimethylbutylsulfonium+X−, dibutylmethylsulfonium+X−, tributylsulfonium+X−, dimethylhexylsulfonium+X−, dihexylmethylsulfonium+X−, trihexylsulfonium+X−, dimethyloctylsulfonium+X−, dioctylmethylsulfonium+X−, and trioctylsulfonium+X−.

In some embodiments of Formula (8), two or three of $R^{25}$, $R^{26}$, and $R^{27}$ are interconnected to form a sulfonium-containing ring or bicyclic ring system, as described above for the phosphonium cyclic systems. Some examples of sulfonium ionic liquids containing a sulfonium-containing ring or bicyclic ring system are provided by the following formulas:

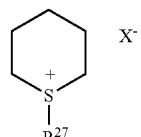

(8a)

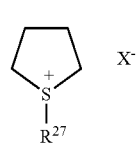

(8b)

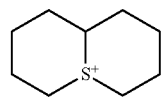

(8c)

In some embodiments, the cyclic sulfonium ring shown in any of Formulas (8a)-(8c) may have a ring carbon atom replaced with a heteroatom selected from oxygen (O), sulfur (S), and/or nitrogen (—NR—). Moreover, any of the hydrogen atoms residing on ring carbon atoms may be substituted with one or more other groups, such as a hydrocarbon group (R), alkoxide group (—OR), hydroxy group (OH), amino group (—NH$_2$, —NHR, or —NR$_2$), carboxamide group (—C(O)NR$_2$ wherein one or both R groups can be replaced with H), and/or halogen atom (e.g., F, Cl, Br, or I atom), wherein the R groups may be the same or different and may or may not be interconnected to form a ring. Any of the sulfonium cationic portions shown in any of Formulas (8) and (8a)-(8c) may also include one or more substituents containing another neutral or charged sulfur atom, such that the sulfonium ionic liquid may be a disulfonium or trisulfonium ionic liquid, as derived from, for example, a benzodithiophene or 3,3'-dibromo-2,2'-dithiophene by appropriate alkylation.

In some embodiments, any of the above general classes or specific types of ionic liquids, or general classes or specific types of cationic portions of the above ionic liquids, are excluded. Moreover, in some embodiments, a mixture of two or more of the foregoing ionic liquids is used.

The counteranion (X⁻) of the ionic liquid is any counteranion which, when associated with the cationic component, permits the resulting ionic compound to behave as an ionic liquid. As known in the art, the composition and structure of the counteranion strongly affects the properties (e.g., melting point, volatility, stability, viscosity, hydrophobicity, and so on) of the ionic liquid. In some embodiments, the counteranion is structurally symmetrical, while in other embodiments, the counteranion is structurally asymmetrical.

In one embodiment, the counteranion of the ionic liquid is non-carbon-containing (i.e., inorganic). The inorganic counteranion may, in one embodiment, lack fluorine atoms. Some examples of such counteranions include chloride, bromide, iodide, hexachlorophosphate ($PCl_6^-$), perchlorate, chlorate, chlorite, cyanate, isocyanate, thiocyanate, isothiocyanate, perbromate, bromate, bromite, periodate, iodate, dicyanamide (i.e., $N(CN)_2^-$), tricyanamide (i.e., $N(CN)_3^-$), aluminum chlorides (e.g., $Al_2Cl_7^-$ and $AlCl_4^-$), aluminum bromides (e.g., $AlBr_4^-$), nitrate, nitrite, sulfate, sulfite, hydrogensulfate, hydrogensulfite, phosphate, hydrogenphosphate ($HPO_4^{2-}$), dihydrogenphosphate ($H_2PO_4^-$), phosphite, arsenate, antimonate, selenate, tellurate, tungstate, molybdate, chromate, silicate, the borates (e.g., borate, diborate, triborate, tetraborate), anionic borane and carborane clusters (e.g., $B_{10}H_{10}^{2-}$ and $B_{12}H_{12}^{2-}$), perrhenate, permanganate, ruthenate, perruthenate, and the polyoxometallates. The inorganic counteranion may, in another embodiment, include fluorine atoms. Some examples of such counteranions include fluoride, bifluoride ($HF_2^-$), hexafluorophosphate ($PF_6^-$), fluorophosphate ($PO_3F^{2-}$), tetrafluoroborate ($BF_4^-$), aluminum fluorides (e.g., $AlF_4^-$), hexafluoroarsenate ($AsF_6^-$), and hexafluoroantimonate ($SbF_6^-$).

In another embodiment, the counteranion of the ionic liquid is carbon-containing (i.e., organic). The organic counteranion may, in one embodiment, lack fluorine atoms. Some examples of such counteranions include carbonate, bicarbonate, the carboxylates (e.g., formate, acetate, propionate, butyrate, valerate, lactate, pyruvate, oxalate, malonate, glutarate, adipate, decanoate, salicylate, ibuprofenate, and the like), the sulfonates (e.g., $CH_3SO_3^-$, $CH_3CH_2SO_3^-$, $CH_3(CH_2)_2SO_3^-$, benzenesulfonate, toluenesulfonate, dodecylbenzenesulfonate, docusate, and the like), the alkoxides (e.g., methoxide, ethoxide, isopropoxide, phenoxide, and glycolate), the amides (e.g., dimethylamide and diisopropylamide), diketonates (e.g., acetylacetonate), the organoborates (e.g., $BR_1R_2R_3R_4^-$, wherein $R_1$, $R_2$, $R_3$, $R_4$ are typically hydrocarbon groups containing 1 to 6 carbon atoms), the alkylsulfates (e.g., diethylsulfate), alkylphosphates (e.g., ethylphosphate or diethylphosphate), and the phosphinates (e.g., bis-(2,4,4-trimethylpentyl)phosphinate). The organic counteranion may, in another embodiment, include fluorine atoms. Some examples of such counteranions include the fluorosulfonates (e.g., $CF_3SO_3^-$, $CF_3CF_2SO_3^-$, $CF_3(CF_2)_2SO_3^-$, $CHF_2CF_2SO_3^-$, and the like), the fluoroalkoxides (e.g., $CF_3O^-$, $CF_3CH_2O^-$, $CF_3CF_2O^-$, and pentafluorophenolate), the fluorocarboxylates (e.g., trifluoroacetate and pentafluoropropionate), and the fluorosulfonylimides (e.g., $(CF_3SO_2)_2N^-$).

In particular embodiments, the counteranion (X⁻) of the ionic liquid has a structure according to the following general formula:

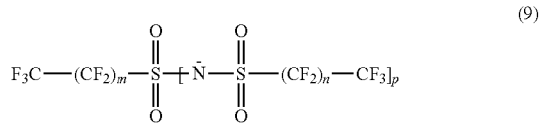

(9)

In Formula (9) above, subscripts m and n are independently 0 or an integer of 1 or above. Subscript p is 0 or 1, provided that when p is 0, the group $-N-SO_2-(CF_2)_nCF_3$ subtended by p is replaced with an oxide atom connected to the sulfur atom (S).

In one embodiment of Formula (9), subscript p is 1, so that Formula (9) reduces to the chemical formula:

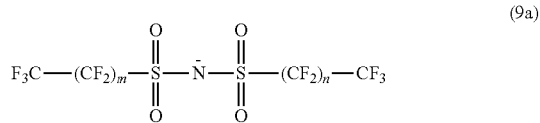

(9a)

In one embodiment of Formula (9a), m and n are the same number, thereby resulting in a symmetrical counteranion. In another embodiment of formula (9a), m and n are not the same number, thereby resulting in an asymmetrical counteranion.

In a first set of embodiments of Formula (9a), m and n are independently at least 0 and up to 1, 2, 3, 4, 5, 6, 7, 8, 9, 10, or 11. When m and n are both 0, the resulting anion has the formula $F_3CSO_2NSO_2CF_3$, i.e., bis-(trifluoromethylsulfonyl)imide, or $Tf_2N^-$. In another embodiment, m and n are not both 0. For example, in a particular embodiment, m is 0 while n is a value of 1 or above (e.g., 1, 2, 3, 4, 5, 6, 7, 8, 9, 10, or 11). Some examples of such anions include $F_3CSO_2NSO_2CF_2CF_3$, $F_3CSO_2NSO_2(CF_2)_2CF_3$, $F_3CSO_2NSO_2(CF_2)_3CF_3$, $F_3CSO_2NSO_2(CF_2)_4CF_3$, $F_3CSO_2NSO_2(CF_2)_5CF_3$, and so on, wherein it is understood that, in the foregoing examples, the negative sign indicative of a negative charge (i.e., "−") in the anion has been omitted for the sake of clarity.

In a second set of embodiments of Formula (9a), m and n are independently at least 1 and up to 2, 3, 4, 5, 6, 7, 8, 9, 10, or 11. For example, in a particular embodiment, m is 1 while n is a value of 1 or above (e.g., 1, 2, 3, 4, 5, 6, 7, 8, 9, 10, or 11). Some examples of such anions include $N[SO_2CF_2CF_3]_2$ (i.e., "BETI⁻"), $F_3CF_2CSO_2NSO_2(CF_2)_2CF_3$, $F_3CF_2CSO_2NSO_2(CF_2)_3CF_3$, $F_3CF_2CSO_2NSO_2(CF_2)_4CF_3$, $F_3CF_2CSO_2NSO_2(CF_2)_5CF_3$, and so on.

In a third set of embodiments of Formula (9a), m and n are independently at least 2 and up to 3, 4, 5, 6, 7, 8, 9, 10, or 11. For example, in a particular embodiment, m is 2 while n is a value of 2 or above (e.g., 2, 3, 4, 5, 6, 7, 8, 9, 10, or 11). Some examples of such anions include $N[SO_2(CF_2)_2CF_3]_2$, $F_3C(F_2C)_2SO_2NSO_2(CF_2)_3CF_3$, $F_3C(F_2C)_2SO_2NSO_2(CF_2)_4CF_3$, $F_3C(F_2C)_2SO_2NSO_2(CF_2)_5CF_3$, and so on.

In a fourth set of embodiments of Formula (9a), m and n are independently at least 3 and up to 4, 5, 6, 7, 8, 9, 10, or 11. For example, in a particular embodiment, m is 3 while n is a value of 3 or above (e.g., 3, 4, 5, 6, 7, 8, 9, 10, or 11). Some examples of such anions include $N[SO_2(CF_2)_3CF_3]_2$, $F_3C(F_2C)_3SO_2NSO_2(CF_2)_4CF_3$, $F_3C(F_2C)_3SO_2NSO_2(CF_2)_5CF_3$, $F_3C(F_2C)_3SO_2NSO_2(CF_2)_6CF_3$, $F_3C(F_2C)_3SO_2NSO_2(CF_2)_7CF_3$, and so on.

In a fifth set of embodiments of Formula (9a), m and n are independently at least 4 and up to 5, 6, 7, 8, 9, 10, or 11. For example, in a particular embodiment, m is 4 while n is a value of 4 or above (e.g., 4, 5, 6, 7, 8, 9, 10, or 11). Some examples of such anions include $N[SO_2(CF_2)_4CF_3]_2$, $F_3C(F_2C)_4 SO_2NSO_2(CF_2)_5CF_3$, $F_3C(F_2C)_4SO_2NSO_2(CF_2)_6CF_3$, $F_3C(F_2C)_4SO_2NSO_2(CF_2)_7CF_3$, $F_3C(F_2C)_4SO_2NSO_2(CF_2)_8 CF_3$, and so on.

In a sixth set of embodiments of Formula (9a), m and n are independently at least 5 and up to 6, 7, 8, 9, 10, or 11. For example, in a particular embodiment, m is 5 while n is a value of 5 or above (e.g., 5, 6, 7, 8, 9, 10, or 11). Some examples of such anions include $N[SO_2(CF_2)_5CF_3]_2$, $F_3C(F_2C)_5 SO_2NSO_2(CF_2)_6CF_3$, $F_3C(F_2C)_5SO_2NSO_2(CF_2)_7CF_3$, $F_3C (F_2C)_5SO_2NSO_2(CF_2)_8CF_3$, $F_3C(F_2C)_5SO_2NSO_2(CF_2)_9 CF_3$, and so on.

In a seventh set of embodiments of Formula (9a), m and n are independently at least 6 and up to 7, 8, 9, 10, or 11. For example, in a particular embodiment, m is 6 while n is a value of 6 or above (e.g., 6, 7, 8, 9, 10, or 11). Some examples of such anions include $N[SO_2(CF_2)_6CF_3]_2$, $F_3C(F_2C)_6 SO_2NSO_2(CF_2)_7CF_3$, $F_3C(F_2C)_6SO_2NSO_2(CF_2)_8CF_3$, $F_3C (F_2C)_6SO_2NSO_2(CF_2)_9CF_3$, $F_3C(F_2C)_6SO_2NSO_2(CF_2)_{10} CF_3$, and so on.

In other embodiments of Formula (9a), m abides by one or a number of alternative conditions set forth in one of the foregoing seven embodiments while n abides by one or a number of alternative conditions set forth in another of the foregoing seven embodiments.

In another embodiment of Formula (9), subscript p is 0, so that Formula (9) reduces to the chemical formula:

(9b)

In different exemplary embodiments of Formula (9b), m can be 0 or above (e.g., up to 1, 2, 3, 4, 5, 6, 7, 8, 9, 10, or 11), 1 or above (e.g., up to 2, 3, 4, 5, 6, 7, 8, 9, 10, or 11), 2 or above (e.g., up to 3, 4, 5, 6, 7, 8, 9, 10, or 11), 3 or above (e.g., up to 4, 5, 6, 7, 8, 9, 10, or 11), 4 or above (e.g., up to 5, 6, 7, 8, 9, 10, or 11), 5 or above (e.g., up to 6, 7, 8, 9, 10, or 11), 6 or above (e.g., up to 7, 8, 9, 10, or 11), 7 or above (e.g., up to 8, 9, 10, 11, or 12), 8 or above (e.g., up to 9, 10, 11, or 12), or 9 or above (e.g., up to 10, 11, 12, 13, 14, 15, or 16). Some examples of such anions include $F_3CSO_3^-$ (i.e., "triflate" or "TfO$^-$"), $F_3CF_2CSO_3^-$, $F_3C(F_2C)_2SO_3^-$, $F_3C(F_2C)_3SO_3^-$ (i.e., "nonaflate" or "NfO$^-$"), $F_3C(F_2C)_4SO_3^-$, $F_3C(F_2C)_5 SO_3^-$, $F_3C(F_2C)_6SO_3^-$, $F_3C(F_2C)_7SO_3^-$, $F_3C(F_2C)_8SO_3^-$, $F_3C(F_2C)_9SO_3^-$, $F_3C(F_2C)_{10}SO_3^-$, $F_3C(F_2C)_{11}SO_3^-$, and so on.

The ionic liquid can be of any suitable purity level. Preferably, the ionic liquid has a purity at least or greater than 90%, 95%, 96%, 97%, 98%, 99%, 99.5%, or 99.9%. The ionic liquid is preferably substantially devoid of salt byproducts (e.g., $LiNO_3$) that are typically produced during synthesis of the ionic liquid. In preferred embodiments, it is desirable that the ionic liquid contains less than 1% by weight of salt byproducts, and more preferably, less than 0.5%, 0.1%, 0.01%, or even 0.001% by weight of salt byproducts.

The ionic liquid is covalently attached to refractory solid sorbent particles, hereinafter referred to as "sorbent particles". The term "refractory", as used herein, indicates that the sorbent particles are substantially heat resistant by not melting or decomposing at temperatures of up to, for example, 100, 150, 200, 250, 300, 350, or 400° C. The term "refractory" also preferably indicates that the sorbent particles are substantially chemical resistant by not decomposing, deteriorating, dissolving, or breaking apart upon contact with solvent and gaseous electrophilic species. The term "sorbent" indicates that the particles have high surface areas by virtue of mesopores included therein, which confers a high degree of absorbing ability. In some embodiments, the sorbent particles have a tensile modulus of at least 1, 2, 5, or 10 GPa and a tensile strength of at least 100, 120, 160, 180, or 200 MPa.

In one set of embodiments, the sorbent particles have an organic composition. By having an "organic composition" is meant that the composition contains carbon-hydrogen (C—H) groups. The organic composition is typically a polymeric composition. The polymeric composition typically contains phenylene or other aromatic (or heteroaromatic) groups. Preferably, the polymers in the polymeric composition are high temperature polymers with high strength and chemical resistance. In particular embodiments, the polymeric composition can be, for example, a polyamide (e.g., based on paraphenylenediamine, e.g., PA), a polyimide (PI), polyamide-imide (PAI), polyetherimide (PEI), polyether ether ketone (PEEK), polyphenylsulfone (PPSU), polyethersulfone (PES), polysulfone (PSU), high temperature sulfone resins, polyphenylene, polybenzimidazole (PBI), polyphenylene sulfide (PPS), and aromatic polyamide (e.g., Aramid or Kevlar), as well as combinations thereof, such as homogeneous or heterogeneous composites thereof. Such polymeric materials are well known in the art.

In a second set of embodiments, the sorbent particles have an inorganic composition. By having an "inorganic composition" is meant that the composition does not contain carbon-hydrogen (C—H) groups. Thus, sorbent particles composed of elemental carbon (e.g., carbon black, mesoporous carbons, and carbon nanotubes, as well known in the art) are herein considered to be inorganic particles.

In particular embodiments, the inorganic sorbent has a composition that is or includes an oxide of a transition metal. The term "transition metal", as used herein, refers to any of the elements of Groups III-XII (scandium through zinc groups) of the Periodic Table. In some embodiments, the metal species is or includes a first-row transition metal. Some examples of first-row transition metal ions include Sc(III), Ti(IV), V(III), V(IV), V(V), Cr(III), Cr(VI), Mn(VII), Mn(V), Mn(V), Mn(III), Fe(II), Fe(III), Co(III), Ni(III), Cu(I), and Cu(II). In other embodiments, the metal species is or includes a second-row transition metal. Some examples of second-row transition metal ions include Y(III), Zr(IV), Nb(IV), Nb(V), Mo(IV), Mo(VI), Ru(IV), Ru(VIII), Rh(III), Rh(IV), Pd(II), Ag(I), and Cd(II). In other embodiments, the metal species is or includes a third-row transition metal. Some examples of third-row transition metal species include Hf(IV), Ta(V), W(III), W(IV), W(VI), Re(IV), Re(VII), Ir(IV), Pt(IV), and Au(III). Some examples of metal oxide compositions containing a transition metal include the monometal oxide compositions $Sc_2O_3$ (scandia), $TiO_2$ (titania), chromium oxide (e.g., $Cr_2O_3$), manganese oxide (e.g., $Mn_3O_4$), iron oxide (e.g., $Fe_2O_3$, $Fe_3O_4$, or FeO), cobalt oxide (e.g., $Co_2O_3$), nickel oxide (e.g., $Ni_2O_3$), copper oxide (e.g., CuO or $Cu_2O$), zinc oxide (ZnO), yttria ($Y_2O_3$), zirconia ($ZrO_2$), niobia (e.g., $NbO_2$ or $Nb_2O_5$), $RuO_2$, PdO, $Ag_2O$, CdO, $HfO_2$, $Ta_2O_5$, $WO_2$, and $PtO_2$, as well as mixed-metal oxide compositions wherein one or more metals replace a portion of any of the metals in the foregoing compositions, e.g., replacing a portion of Fe in $Fe_3O_4$ with Co to result in $CoFe_2O_4$, or wherein any of the foregoing metal oxide compositions are in admixture. Other examples of metal oxide compositions include the paratungstates and polyoxometallates, e.g., polyoxomolybdates, polyoxotungstates, and polyoxovanadates. Such oxide compositions and methods for their synthesis are well known in the art.

In other embodiments, the inorganic sorbent has a composition that is or includes an oxide of an alkali, alkaline earth, main group, or lanthanide metal. Some examples of alkali metal species include $Li^+$, $Na^+$, $K^+$, and $Rb^+$, which may be incorporated in such mono-metal oxide compositions as $Li_2O$, $Na_2O$, $K_2O$, and $Rb_2O$, and combinations thereof. Some examples of alkaline earth metal species include $Be^{2+}$, $Mg^{2+}$, $Ca^{2+}$, and $Sr^{2+}$, which may be incorporated in such mono-metal oxide compositions as BeO (beryllia), MgO, CaO, and SrO, and combinations thereof. Some examples of main group metal species (e.g., cations of Group IIIA-VIIA of the Periodic Table), include $B^{3+}$, $Al^{3+}$, $Ga^{3+}$, $In^{3+}$, $Tl^{1+}$, $Tl^{3+}$, $Si^{4+}$, $Ge^{4+}$, $Sn^{2+}$, $Sn^{4+}$, $Pb^{2+}$, $b^{4+}$, $N^{3+}$, $P^{3+}$, $P^{5+}$, $As^{3+}$, $As^{5+}$, $Sb^{3+}$, $Sb^{5+}$, and $Bi^{3+}$, which may be incorporated in such mono-metal oxide compositions as silica ($SiO_2$), alumina ($Al_2O_3$), boron oxide (e.g., $B_2O_3$), gallium oxide (e.g., $Ga_2O_3$), indium oxide (e.g., $In_2O_3$), tin oxide (e.g., SnO or $SnO_2$), lead oxide (e.g., PbO or $PbO_2$), germanium oxide (e.g., $GeO_2$), antimony oxide (e.g., $Sb_2O_3$ or $Sb_2O_5$), and $Bi_2O_3$, and combinations thereof (e.g., an aluminosilicate or indium tin oxide). Some examples of lanthanide metal species include any of the elements in the Periodic Table having an atomic number of 57 to 71, e.g., $La^{3+}$, $Ce^{3+}$, $Ce^{4+}$, $Pr^{3+}$, $Nd^{3+}$, $Sm^{3+}$, $Eu^{3+}$, $Gd^{3+}$, and $Tb^{3+}$, which may be incorporated in such mono-metal oxide composition as $La_2O_3$, ceria (e.g., $Ce_2O_3$ or $CeO_2$).

In some embodiments, the inorganic sorbent particles have an oxide perovskite structure of the formula:

$$M'M''O_3 \qquad (10)$$

In Formula (10) above, M' and M" are typically different metal cations, thereby being further exemplary of mixed-metal oxide compositions. The metal cations can be independently selected from, for example, the first, second, and third row transition metals, main group, and lanthanide metals. Some examples of perovskite oxides include $CaTiO_3$, $SrTiO_3$, $BaTiO_3$, $SrRuO_3$, $BaMnO_3$, $CaFeO_3$, $YCrO_3$, $BaCrO_3$, $SrCoO_3$, $LaMnO_3$, $LaFeO_3$, $YCrO_3$, and $YMnO_3$. It is also possible for M' and M" in Formula (10) to be the same metal, wherein Formula (10) reduces to $M'_2O_3$. In these compositions, M' is typically a first row transition metal. Some examples of such compositions include $Cr_2O_3$, and $Fe_2O_3$, both having the corundum crystal structure, and $Mn_2O_3$, having the bixbyite crystal structure.

In other embodiments, the inorganic sorbent particles have an oxide spinel structure of the formula:

$$M'_xM''_{3-x}O_4 \qquad (11)$$

In Formula (11) above, M' and M" are the same or different metal cations. Typically, at least one of M' and M" is a transition metal cation, and more typically, a first-row transition metal cation. In order to maintain charge neutrality with the four oxide atoms, the oxidation states of M' and M" sum to +8. Generally, two-thirds of the metal ions are in the +3 state while one-third of the metal ions are in the +2 state. The +3 metal ions generally occupy an equal number of tetrahedral and octahedral sites, whereas the +2 metal ions generally occupy half of the octahedral sites. However, Formula (11) includes other chemically-acceptable possibilities, including that the +3 metal ions or +2 metal ions occupy only octahedral or tetrahedral sites, or occupy one type of site more than another type of site. The subscript x can be any numerical (integral or non-integral) positive value, typically at least 0.01 and up to 1.5.

When M' and M" in Formula (11) are the same, Formula (11) becomes simplified to the general formula:

$$M_3O_4 \qquad (12)$$

Some examples of compositions according to Formula (12) include $Fe_3O_4$ (magnetite), $Co_3O_4$, and $Mn_3O_4$.

Some examples of spinel oxide compositions having two metals include those of the general composition $M'_yFe_{3-y}O_4$ (e.g., $Ti_yFe_{3-y}O_4$, $V_yFe_{3-y}O_4$, $Cr_yFe_{3-y}O_4$, $Mn_yFe_{3-y}O_4$, $Co_yFe_{3-y}O_4$, $Ni_yFe_{3-y}O_4$, $Cu_yFe_{3-y}O_4$, $Zn_yFe_{3-y}O_4$, $Pd_yFe_{3-y}O_4$, $Pt_yFe_{3-y}O_4$, $Cd_yFe_{3-y}O_4$, $Ru_yFe_{3-y}O_4$, $Zr_yFe_{3-y}O_4$, $Nb_yFe_{3-y}O_4$, $Gd_yFe_{3-y}O_4$, $Eu_yFe_{3-y}O_4$, $Tb_yFe_{3-y}O_4$, and $Ce_yFe_{3-y}O_4$); the general composition $M'_yCo_{3-y}O_4$ (e.g., $Ti_yCo_{3-y}O_4$, $V_yCo_{3-y}O_4$, $Cr_yCo_{3-y}O_4$, $Mn_yCo_{3-y}O_4$, $Ni_yCo_{3-y}O_4$, $Cu_yCo_{3-y}O_4$, $Zn_yCo_{3-y}O_4$, $Pd_yCo_{3-y}O_4$, $Pt_yCo_{3-y}O_4$, $Cd_yCo_{3-y}O_4$, $Ru_yCo_{3-y}O_4$, $Zr_yCo_{3-y}O_4$, $Nb_yCo_{3-y}O_4$, $Gd_yCo_{3-y}O_4$, $Eu_yCo_{3-y}O_4$, $Tb_yCo_{3-y}O_4$, and $Ce_yCo_{3-y}O_4$); and the general composition $M'_yNi_{3-y}O_4$ (e.g., $Ti_yNi_{3-y}O_4$, $V_yNi_{3-y}O_4$, $Cr_yNi_{3-y}O_4$, $Mn_yNi_{3-y}O_4$, $Fe_yNi_{3-y}O_4$, $Cu_yNi_{3-y}O_4$, $Zn_yNi_{3-y}O_4$, $Pd_yNi_{3-y}O_4$, $Pt_yNi_{3-y}O_4$, $Cd_yNi_{3-y}O_4$, $Ru_yNi_{3-y}O_4$, $Zr_yNi_{3-y}O_4$, $Nb_yNi_{3-y}O_4$, $Gd_yNi_{3-y}O_4$, $Eu_yNi_{3-y}O_4$, $Tb_yNi_{3-y}O_4$, and $Ce_yNi_{3-y}O_4$), wherein y in the general compositions given above represents an integral or non-integral numerical value of at least 0.1 and up to 2; and M' represents one or a combination of metal ions, e.g., $(M'_a,M''_b)_yFe_{3-y}O_4$, wherein subscripts a and b are non-integral numbers that sum to 1.

In particular embodiments of Formula (11), the oxide spinel structure has the composition:

$$M'M''_2O_4 \qquad (13)$$

In Formula (13) above, M" is typically a trivalent metal ion and M' is typically a divalent metal ion. More typically, M' and M" independently represent transition metals, and more typically, first row transition metals. Some examples of oxide spinel compositions include $NiCr_2O_4$, $CuCr_2O_4$, $ZnCr_2O_4$, $CdCr_2O_4$, $MnCr_2O_4$, $NiMn_2O_4$, $CuMn_2O_4$, $ZnMn_2O_4$, $CdMn_2O_4$, $NiCo_2O_4$, $CuCo_2O_4$, $ZnCo_2O_4$, $CdCo_2O_4$, $MnCo_2O_4$, $NiFe_2O_4$, $CuFe_2O_4$, $ZnFe_2O_4$, $CdFe_2O_4$, and $MnFe_2O_4$. M' and M" can also be combinations of metals, such as in $(Co,Zn)Cr_2O_4$, and $Ni(Cr, Fe)_2O_4$.

In other embodiments, the inorganic sorbent particles have a zeolite composition. The zeolite can be any of the porous aluminosilicate structures known in the art that are stable under high temperature conditions, i.e., of at least 100° C., 150° C., 200° C., 250° C., 300° C., and higher temperatures up to, for example, 500° C., 550° C., 600° C., 650° C., 700° C., 750° C., 800° C., 850° C., or 900° C. In particular embodiments, the zeolite is stable from at least 100° C. and up to 700° C. Typically, the zeolite is ordered by having a crystalline or partly crystalline structure. The zeolite can generally be described as a three-dimensional framework containing silicate ($SiO_2$ or $SiO_4$) and aluminate ($Al_2O_3$ or $AlO_4$) units that are interconnected (i.e., crosslinked) by the sharing of oxygen atoms.

In various embodiments, the zeolite is a MFI-type zeolite, MEL-type zeolite, MTW-type zeolite, MCM-type zeolite, BEA-type zeolite, kaolin, or a faujasite-type of zeolite. Some particular examples of zeolites include the ZSM class of zeolites (e.g., ZSM-5, ZSM-8, ZSM-11, ZSM-12, ZSM-15, ZSM-23, ZSM-35, ZSM-38, ZSM-48), zeolite X, zeolite Y, zeolite beta, and the MCM class of zeolites (e.g., MCM-22 and MCM-49). The compositions, structures, and properties of these zeolites are well-known in the art, and have been described in detail, as found in, for example, U.S. Pat. Nos. 4,721,609, 4,596,704, 3,702,886, 7,459,413, and 4,427,789, the contents of which are incorporated herein by reference in their entirety. In particular embodiments, the zeolite is zeolite 13X or 5A, which may be represented by the chemical formulas $Na_{86}[(AlO_2)_{86}(SiO_2)_{106}] \cdot H_2O$ and $Na_{12}[(AlO_2)_{12}(SiO_2)_{12}] \cdot 27H_2O$, respectively.

The zeolite can have any suitable silica-to-alumina (i.e., $SiO_2/Al_2O_3$ or "Si/Al") ratio. For example, in various embodiments, the zeolite can have a Si/Al ratio of precisely, at least, above, up to, or less than 1, 2, 3, 4, 5, 6, 7, 8, 9, 10, 11, 12, 13, 14, 15, 20, 25, 30, 35, 40, 45, 50, 55, 60, 65, 70, 75, 80, 85, 90, 95, 100, 120, 150, or 200, or a Si/Al ratio within a range bounded by any two of the foregoing values.

Typically, the zeolite contains an amount of cationic species. As is well known in the art, the amount of cationic species is generally proportional to the amount of aluminum in the zeolite. This is because the replacement of silicon atoms with lower valent aluminum atoms necessitates the presence of countercations to establish a charge balance. Some examples of cationic species include hydrogen ions ($H^+$), ammonium ions (e.g., $NR'^+_4$, where R' is selected from hydrogen atom and hydrocarbon group, e.g., $NH_4^+$), alkali metal ions, alkaline earth metal ions, main group metal ions, and transition metal ions. Some examples of alkali metal ions that may be included in the zeolite include lithium ($Li^+$), sodium ($Na^+$), potassium ($K^+$), rubidium ($Rb^+$), and cesium ($Cs^+$). Some examples of alkaline earth metal ions that may be included in the zeolite include ($Be^{2+}$), magnesium ($Mg^{2+}$), calcium ($Ca^{2+}$), strontium ($Sr^{2+}$), and barium ($Ba^{2+}$). Some examples of main group metal ions that may be included in the zeolite include boron ($B^{3+}$), gallium ($Ga^{3+}$), indium ($In^{3+}$), and arsenic ($As^{3+}$). The cationic species may or may not also include one or more of any of the transition metals described above. In some embodiments, a combination of cationic species is included. The cationic species can be in a trace amount (e.g., no more than 0.01 or 0.001%), or alternatively, in a significant amount (e.g., above 0.01%, and up to, for example, 0.1, 0.5, 1, 2, 3, 4, or 5% by weight of the zeolite). In some embodiments, any one or more of the above classes or specific examples of cationic species are excluded from the zeolite.

In a third set of embodiments, the sorbent particles have a hybrid organic-inorganic composition, such as an organically modified silicate (ormosil), organic-inorganic sol gel (e.g., a ceramer), or metal organic framework (MOF). As known in the art, a metal organic framework is composed of metal ions and linking organic molecules (ligands) that are continuously interlinked so as to form a one-, two-, or three-dimensional hybrid framework. Alternatively, the hybrid material is formed of a mixture of any of the organic and inorganic compositions described above.

The sorbent particles contain mesopores, and hence, are referred to as "mesoporous" sorbent particles. As used herein and as understood in the art, the terms "mesopores" and "mesoporous" refer to pores having a size (i.e., pore diameter or pore size) of at least or above 2 nm and up to or less than 50 nm, i.e., "between 2 and 50 nm", or "in the range of 2-50 nm". In different embodiments, the mesopores have a size of precisely, about, at least, above, up to, or less than, for example, 3 nm, 4 nm, 5 nm, 6 nm, 7 nm, 8 nm, 9 nm, 10 nm, 11 nm, 12 nm, 15 nm, 20 nm, 25 nm, 30 nm, 35 nm, 40 nm, 45 nm, or 50 nm, or a particular size, or a variation of sizes, within a range bounded by any two of the foregoing exemplary values, or between 2 nm and any of the foregoing exemplary values.

The mesopores, and other pores, are generally circular or oval-shaped. For circular or substantially circular pores, the pore size refers to the diameter of the pore. For pores that are substantially unsymmetrical or irregularly shaped, the pore size generally refers to either the average of the pore dimensions for a particular pore, or to the average or longest dimension of such pores averaged over a population of such pores.

In one set of embodiments, a single distribution of mesopores is present in the sorbent particles. A distribution (or "mode") of pores is generally defined by a single pore size of maximum (peak) pore volume concentration. Alternatively, the sorbent particles may have a bimodal, trimodal, or higher multimodal mesopore size distribution, which can be identified by the presence of, respectively, two, three, or a higher number of peak mesopore volume concentrations associated with, respectively, one, two, three, or a higher number of individual mesopore size distributions bounded on each end by a minimum mesopore size and a maximum mesopore size. The pore size distributions can be overlapping or non-overlapping. For example, the sorbent particles can include a monomodal, bimodal, trimodal, or higher multimodal mesopore size distribution, wherein each mesopore size distribution is bounded by a minimum mesopore size and maximum mesopore size selected from 2 nm, 3 nm, 4 nm, 5 nm, 6 nm, 7 nm, 8 nm, 9 nm, 10 nm, 12 nm, 15 nm, 20 nm, 25 nm, 30 nm, 35 nm, 40 nm, 45 nm, and 50 nm. Any of the exemplary mesopore sizes provided above can also be taken as a pore size of peak pore volume concentration associated with a particular pore size distribution.

Micropores (i.e., pore sizes less than 2 nm) may or may not also be present in the mesoporous sorbent particles. In different embodiments, the micropores have a size of precisely, about, up to, or less than, for example, 0.5, 0.6, 0.7, 0.8, 0.9, 1.0, 1.2, 1.5, or 1.8 nm, or a particular size, or a variation of sizes, within a range bounded by any two of these values. When micropores are present, the sorbent particles can have a distribution of pore sizes in a range bounded by any of the foregoing micropore sizes and any of the foregoing mesopore sizes.

In some embodiments, micropores may be desirable, whereas in other embodiments, micropores may be not desirable. In some embodiments, the pore volume attributed to micropores is no more than (or less than) 70%, 60%, or 50% of the total pore volume, particularly since micropores slow the flow of liquid or gas, and the flow of a gas or liquid through the sorbent particles is generally required in using the sorbent particles in gas uptake. In other embodiments, the pore volume attributed to micropores is about, up to, less than, at least, or above, for example, 1%, 2%, 5%, 10%, 15%, 20%, 25%, 30%, 35%, 40%, or 45% of the total pore volume, or a pore volume within a range bounded by any two of the foregoing values. In some embodiments, the pore volume due to micropores is less than the pore volume due to mesopores (i.e., pore volume due to mesopores is more than the pore volume due to micropores). In different embodiments, the percent micropore volume with respect to the sum of micropore and mesopore volumes is any of the pore volume values up to or less than 50%, 60%, or 70%, or as provided above. In some embodiments, the sorbent particles may possess a substantial absence of micropores. By a "substantial absence" of micropores is generally meant that up to or less than 1%, 0.5%, or 0.1% of the total pore volume, or none of the pore volume, can be attributed to the presence of micropores.

In some embodiments, macropores are also present in the sorbent particles. Particularly since the flow of a liquid or gas through the sorbent particles is generally required during the process for gas uptake, the presence of macropores may be desirable in making the process more efficient. Generally, the macropores considered herein have a size greater than 50 nm and up to or less than 1 micron (1 µm). In different embodiments, the macropores have a size of precisely, about, at least, greater than, up to, or less than, for example, 55 nm, 60 nm, 65 nm, 70 nm, 75 nm, 80 nm, 85 nm, 90 nm, 95 nm, 100 nm, 110 nm, 120 nm, 130 nm, 140 nm, 150 nm, 160 nm, 170 nm, 180 nm, 190 nm, 200 nm, 225 nm, 250 nm, 275 nm, 300 nm, 325 nm, 350 nm, 375 nm, 400 nm, 425 nm, 450 nm, 475 nm, or 500 nm, or a particular size, or a variation of sizes, within a range bounded by any two of the foregoing values. When macropores are present, the sorbent particles can have a distribution of pore sizes in a range bounded by any of the disclosed mesopore sizes and any of the foregoing macropore sizes, or between any of the disclosed micropore sizes and any of the foregoing macropore sizes. In different embodiments, the pore volume attributed to macropores is about, up to, less than, at least, or above, for example, 1%, 2%, 5%, 10%, 15%, 20%, 25%, 30%, 35%, 40%, 45%, 50%, 60%, or 70% of the total pore volume, or a pore volume within a range bounded by any two of the foregoing values. Any of the foregoing values may also be taken as the percent macropore volume with respect to the sum of macropore and mesopore volumes. In some embodiments, the mesoporous carbon may possess a substantial absence of macropores. By a "substantial absence" of macropores is generally meant that up to or less than 1%, 0.5%, or 0.1% of the total pore volume, or none of the pore volume, can be attributed to the presence of macropores.

In some embodiments, the sorbent particles contain only mesopores (i.e., 100% pore volume attributed to mesopores), while in other embodiments, the sorbent particles contain mesopores and micropores, or mesopores and macropores, or a combination of mesopores, micropores, and macropores. When mesopores are in combination with micropores and/or macropores, the percent pore volume of each pore size range can be any suitable amount, e.g., precisely, about, at least, up to, or less than 1%, 2%, 5%, 10%, 15%, 20%, 25%, 30%, 35%, 40%, 45%, 50%, 55%, 60%, 65%, 70%, 75%, 80%, 85%, 90%, 95%, 98%, or 99% percent pore volume, wherein it is understood that the total percent pore volume sums to 100%. Similarly, particular pore size sub-ranges within the mesopore size range (or within the micropore or macropore size range, if present) can have their own percent pore volumes, such as any of those exemplified above.

The sorbent particles may possess any suitable BET surface area, such as a BET surface area of about or at least, for example, 50, 100, 200, 300, 400, 450, 500, 550, 600, 650, 700, 750, 800, 900, 1000, 1500, 1800, 2000, 2200, 2500, 2800, or 3000 $m^2/g$, or a surface area within a range bounded by any two of these values. The sorbent particles may also possess any suitable total pore volume, such as a total pore volume of precisely, about, or at least, for example, 0.2 $cm^3/g$, 0.3 $cm^3/g$, 0.4 $cm^3/g$, 0.5 $cm^3/g$, 0.6 $cm^3/g$, 0.7 $cm^3/g$, 0.8 $cm^3/g$, 0.9 $cm^3/g$, 1.0 $cm^3/g$, 1.2 $cm^3/g$, 1.5 $cm^3/g$, 1.8 $cm^3/g$, 2 $cm^3/g$, 2.2 $cm^3/g$, 2.5 $cm^3/g$, 3.0 $cm^3/g$, 3.5 $cm^3/g$, 4.0 $cm^3/g$, 4.5 $cm^3/g$, 5.0 $cm^3/g$, 5.5 $cm^3/g$, or 6.0 $cm^3/g$, or a pore volume within a range bounded by any two of these values.

The sorbent particles can be in any suitable particulate form, e.g., spherical, ovoid, polyhedral (e.g., cuboidal, tetrahedral, octahedral), elongated, or fibrous. The sorbent particles can be nanoparticles, microparticles, or macroscopic particles (e.g., in the millimeter size range). The sorbent particles can have a uniform or average size of precisely, about, up to, or less than, for example, 1 nm, 2 nm, 5 nm, 10 nm, 20 nm, 30 nm, 40 nm, 50 nm, 100 nm, 150 nm, 200 nm, 250 nm, 300 nm, 350 nm, 400 nm, 450 nm, 500 nm, 550 nm, 600 nm, 650 nm, 700 nm, 750 nm, 800 nm, 850 nm, 900 nm, or 950 nm, or a size within a range bounded by any two of the foregoing values, or between any of the foregoing values and less than or up to 1, 2, 3, 4, 5, 10, 15, 20, 30, 40, 50, 60, 70, 80, 90, 100, 150, 200, 250, 300, 350, 400, 450, or 500 microns, or a size between any of the foregoing micron-sized values.

In some embodiments, any one or more of the above classes or specific types of sorbent composition are excluded. In other embodiments, the sorbent composition is a combination (e.g., composite or mixture) of any two or more of the above sorbent compositions.

In the composite structure, the ionic liquid is covalently attached to the sorbent particles. The ionic liquid may be covalently attached to the sorbent particles by any suitable means, including any of the means known in the art for covalently attaching a molecule to a macroscopic solid surface. Generally, to attach the ionic liquid to the sorbent particle, the ionic liquid possesses a functional group that is reactive with a surface functional group on the sorbent particle. The surface functional group may be a group native to the surface of the sorbent particle or may be a group that has been placed, by appropriate chemical modification, on the surface of the sorbent particle. The covalent attachment may or may not also be within pores of the sorbent particles, or between pores and within pores. For example, in the case of metal oxide (e.g., silica or alumina) sorbent particles, an ionic liquid possessing a surface-reactive siloxane group can generally react with the surface of the metal oxide particle via hydrolytic reaction between surface hydroxy groups and the siloxane group. Alternatively, the metal oxide surface may be first modified by reaction with a bifunctional hydroxy-reactive molecule (e.g., chloroalkylsiloxane), such that, after reaction, a reactive group (e.g., chloroalkyl) on the surface is accessible for reaction with an ionic liquid possessing a group (e.g., primary or secondary amine) that is reactive with the reactive group on the surface. Numerous other binding methodologies are possible, as well known in the art. In many instances, the methods may rely on well known crosslinking methodologies in which molecules are attached to each other via bifunctional linkers, e.g., amine-amine coupling via an activated diester linker, or amine-thiol coupling via an alkenyl-activated ester linker. In the case of polymeric sorbents, these typically have some reactive functional groups (e.g., amino, keto, or hydroxy), or can be suitably modified to contain reactive functional groups, to permit a suitable linking methodology to an ionic liquid possessing suitable crosslinking groups.

In some embodiments, the sorbent particles (with ionic liquid covalently attached) are incorporated into (i.e., contained within) refractory hollow fibers (i.e., tubes). By being "incorporated into" or "contained within" the hollow fibers is meant that the sorbent particles either occupy the hollow space of the hollow fibers or are embedded within the walls of the hollow fiber, or both.

The refractory hollow fibers can have any of the organic or inorganic compositions described above for the sorbent particles. However, more generally, the hollow fibers can have any of a wide range of inorganic compositions, including oxides, carbides, borides, nitrides, and silicides of any of the main group or transition metals provided above. The hollow fibers may also be composed of an element, such as carbon (e.g., carbon nanotubes) or a metal (e.g., silicon, aluminum, cobalt, or nickel). Several metal carbide nanotubes are described in, for example, E. W. Wong, et al., *Chem. Mater.*, 8, pp. 2041-2046 (1996), the contents of which are herein incorporated by reference in its entirety. In different embodiments, the refractory hollow fibers have a uniform or average internal diameter of precisely, about, at least, greater than, up to, or less than, for example, 1 nm, 2 nm, 5 nm, 10 nm, 20 nm, 30 nm, 40 nm, 50 nm, 100 nm, 150 nm, 200 nm, 250 nm, 300 nm, 350 nm, 400 nm, 450 nm, 500 nm, 550 nm, 600 nm, 650 nm, 700 nm, 750 nm, 800 nm, 850 nm, 900 nm, or 950 nm, or an internal diameter within a range bounded by any two of the foregoing values, or between any of the foregoing values and less than or up to 1, 2, 3, 4, 5, 10, 15, 20, 30, 40, 50, 60, 70, 80, 90, 100, 150, 200, 250, 300, 350, 400, 450, 500, 550, 600, 650, 700, 750, 800, 850, 900, 950, or 1000 microns, or a size between any of the foregoing micron-sized values. The hollow fiber can also have any suitable external diameter and any suitable wall thickness, both of which may be independently selected from any of the foregoing exemplary values. The hollow fibers necessarily need to be open on both ends in order to permit the flow of gas, and optionally, fluid.

The hollow fibers can be produced by any of the means known in the art. For example, metal oxide hollow tubes have been produced by template-assisted synthesis based on interfacial reaction as well as interfacial oxidation/reduction-directed synthesis (e.g., G. Chen, et al., *Adv. Funct. Mater.,* 22: 3914-3920, 2012); or by impregnation of a metal or metal oxide (e.g., indium-tin-oxide or silicon or a metal silicide) into pores of a porous template (e.g., anodized aluminum oxide membrane) followed by etching of the membrane (e.g., M. D. Dickey, et al., *ACS Nano,* 2 (4), pp 800-808, 2008; and Z. Zhang, et al., *Nanotechnology,* 21(5), 2010); or by anodization of a metal (e.g., aluminum) in an electrolyte (e.g., I. Paramasivam, et al., *Electrochimica Acta,* 54, pp. 643-648, 2008).

In particular embodiments, the hollow fibers are produced by a phase inversion process (also commonly referred to as a dry-wet spinning process), as well known in the art, for producing hollow fibers, as described in, for example, D. T. Clausi, et al., *Journal of Membrane Science,* 167(1), pp. 79-89 (2000) for producing polyimide hollow fiber membranes, and as also described in J. S. Lee et al., *Polymer,* 53, pp. 5806-5815 (2012) for producing polyetherimide (PEI) and polyamide-imide (PAI) hollow fibers, and as also described in R. P. Lively, et al., *Ind. Eng. Chem. Res.,* 48, pp. 7314-7324 (2009) for producing hollow fibers made of cellulose acetate and polyvinylpyrrolidone, the contents of which are herein incorporated by reference in their entirety. In brief, the phase inversion process is a fiber spinning process in which a polymer solution containing a pore former is extruded through a die (i.e., spinneret) into a non-solvent quench bath. The non-solvent bath causes mass transfer to induce separation and the formation of a porous fiber. In particular embodiments, the instant invention employs a modified version of the phase inversion process in which the ionic liquid-functionalized sorbent particles described above are incorporated into the polymer solution during the phase inversion process.

In another aspect, the invention is directed to a method for capturing an electrophilic gas using any of the composite structures described above. In the method, the one or more electrophilic gases, which are typically in a gaseous effluent stream that may or may not contain other (e.g., inert) gases, are contacted with any of the composite structures described above, thus resulting in capture of the electrophilic gas by the ionic liquid covalently tethered to sorbent particles. In some embodiments, the electrophilic gas is contacted with the composite structure as a dry stream. In other embodiments, the electrophilic gas is contacted with the composite structure through a liquid medium in contact with the composite structure. For example, the electrophilic gas or gas stream containing the electrophilic gas may be bubbled through the liquid medium.

The liquid medium may be, for example, a polar protic or polar aprotic solvent that is not an ionic liquid. Some examples of polar protic solvents include water, the alcohols (e.g., methanol, ethanol, isopropanol, n-butanol, t-butanol, the pentanols, hexanols, octanols, or the like), diols (e.g., ethylene glycol, diethylene glycol, triethylene glycol), and protic amines (e.g., ethylenediamine, ethanolamine, diethanolamine, and triethanolamine). Some examples of polar non-protic solvents include the nitriles (e.g., acetonitrile, propionitrile), sulfoxides (e.g., dimethylsulfoxide), amides (e.g., dimethylformamide, N,N-dimethylacetamide), organochlorides (e.g., methylene chloride, chloroform, 1,1,-trichloroethane), ketones (e.g., acetone, 2-butanone), dialkylcarbonates (e.g., ethylene carbonate, dimethylcarbonate, diethylcarbonate), organoethers (e.g., diethyl ether, tetrahydrofuran, and dioxane), HMPA, NMP, and DMPU.

The liquid medium may or may not be admixed with one or more surfactants in the method. The surfactants can be included to, for example, improve the transfer of gas into the liquid medium by improving the interaction at the gas-liquid phase boundary. In one embodiment, the one or more surfactants include an ionic surfactant, which can be either an anionic, cationic, or zwitterionic surfactant. Some examples of anionic surfactants include the fluorinated and non-fluorinated carboxylates (e.g., perfluorooctanoates, perfluorodecanoates, perfluorotetradecanoates, octanoates, decanoates, tetradecanoates, fatty acid salts), the fluorinated and non-fluorinated sulfonates (e.g., perfluorooctanesulfonates, perfluorodecanesulfonates, octanesulfonates, decanesulfonates, alkyl benzene sulfonate), and the fluorinated and non-fluorinated sulfate salts (e.g., dodecyl sulfates, lauryl sulfates, sodium lauryl ether sulfate, perfluorododecyl sulfate, and other alkyl and perfluoroalkyl sulfate salts). The majority of cationic surfactants contain a positively charged nitrogen atom, such as found in the quaternary ammonium surfactants, e.g., the alkyltrimethylammonium salts wherein the alkyl group typically possesses at least four carbon atoms and up to 14, 16, 18, 20, 22, 24, or 26 carbon atoms. Some examples of cationic surfactants include the quaternary ammonium surfactants (e.g., cetyl trimethylammonium bromide, benzalkonium chloride, and benzethonium chloride), the pyridinium surfactants (e.g., cetylpyridinium chloride), and the polyethoxylated amine surfactants (e.g., polyethoxylated tallow amine). Some examples of zwitterionic surfactants include the betaines (e.g., dodecyl betaine, cocamidopropyl betaine) and the glycinates. Some examples of non-ionic surfactants include the alkyl polyethyleneoxides, alkylphenol polyethyleneoxides, copolymers of polyethyleneoxide and polypropyleneoxide (e.g., poloxamers and poloxamines), alkyl polyglucosides (e.g., octyl glucoside, decyl maltoside), fatty alcohols, (e.g., cetyl alcohol, oleyl alcohol), fatty amides (e.g., cocamide MEA, cocamide DEA), and polysorbates (e.g., polysorbate 20, polysorbate 40, polysorbate 60, polysorbate 80).

Typically, in order for the composite structure to be reused, the electrophilic gas is stripped from the composite structure, i.e., more specifically, from the IL-gas addition product in the composite structure. The electrophilic gas can be separated from the IL-gas addition product by, for example, elevating the temperature and/or lowering the atmospheric pressure of the gas-absorbed composite structure. In the particular case where a liquid medium is in contact with the composite structure, the liquid medium may be suitably heated or lowered in pressure to effect gas release. The separated electrophilic gas can then be directed into a storage facility, or further processed. For efficient storage, the gas is generally concentrated by, for example, suitable pressurization and/or cooling. In other embodiments, the separated gas is reacted with one or more compounds to produce a liquid or solid compound that can be more conveniently stored or used as a feedstock or final end-product.

In particular embodiments, the method uses a composite structure, as described above, that incorporates the IL-functionalized sorbent particles into refractory hollow tubes. The electrophilic gas is then passed through the sorbent-filled tubes either in dry form or through a liquid medium. In preferred embodiments, the tubes include in their construction a bore (channel) that does not include the sorbent particles. The bore can be included in the tubes by any suitable method. For example, matrix-filled fibers may be post-treated by flowing a barrier polymer (e.g., PVDC) at suitable pressure, followed by drying and annealing to include a lumen barrier layer, as described in R. P. Lively, et al., *Ind. Eng. Chem. Res.*, vol. 48, no. 15, pp. 7314-7324 (2009). The purpose of the bore is to flow therethrough a cooling or heating liquid or gas to suitably modulate gas absorption or release (desorption), as also generally depicted in R. P. Lively et al. The barrier layer prevents contact of the cooling/heating gas or liquid with the IL-functionalized sorbent particles. The barrier layer can be, for example, a chloride- or fluoride-functionalized polyvinyl polymer, such as PVC, PVDC, PVF, PVF, PVDF, or PTFE. The gas or liquid may have any composition as long as it provides a suitable cooling or heating characteristic for capture and release of the gas. The liquid passed through the bore can be, for example, any of the solvents described above. For example, suitably cooled water or aqueous solution (e.g., up to or less than 20, 15, 10, or 5° C., or 0, −5, −10, or −15° C. for the case of solute- (e.g., salt-) containing water can be passed through the bore to facilitate gas capture, whereas suitably heated water, aqueous solution, or steam (e.g., about, at least, or above 50, 60, 70, 80, 90, 100, 110, 120, 130, 140, or 150° C., or a temperature in a range therebetween) can be passed through the bore to facilitate gas release. In the foregoing example, water or steam may be replaced with a different solvent, solvent solution, or gas. The composite structure that has been substantially or completely removed of captured gas can then be re-used for capture of additional electrophilic gas.

FIG. 1 depicts a particular embodiment in which bore-containing fibers containing IL-functionalized sorbent particles surrounding the bore are exposed to electrophilic gas. Cooling water passed through the bore facilitates absorption of the electrophilic gas (e.g., carbon dioxide), while steam passed through the bore facilitates release of the gas. In the particular embodiment shown in FIG. 1, a base or superbase is made to be in contact with the ionic liquid to maintain a deprotonated reactive form of the ionic liquid (e.g., alkoxide, thiolate, or imidazolide), wherein the superbase may be complexed with the ionic liquid in the dry state or may be included in a liquid medium in contact with the IL-functionalized sorbent particles. The base can be, for example, any of the known bases capable of deprotonating a hydroxy, thiol, or acidic imidazole carbon (e.g., a metal hydroxide or amide base). Generally, a superbase (B) is distinguished from an ordinary base by having an acid dissociation constant, i.e., pKa, of its conjugate acid $BH^+$, of 20 or above in acetonitrile (or 12 or above in water). In other embodiments, the superbase is characterized by having a pKa of its conjugate acid $BH^+$ of at least 21, 22, 23, 24, 25, 26, 27, 28, 29, or 30 in acetonitrile, or at least 13, 14, 15, or 16 in water. The superbase can be, for example, any of the known superbases, such as 1,8-diazabicyclo[5.4.0]undec-7-ene, 1,8-diazabicyclo [5.4.0]undecane, and the guanidine-containing and phosphazene superbases known in the art, as described in, for example, A. A. Kolomeitsev, et al., *J. Am. Chem. Soc.*, 127, pp. 17656-17666 (2005).

Figure 2:
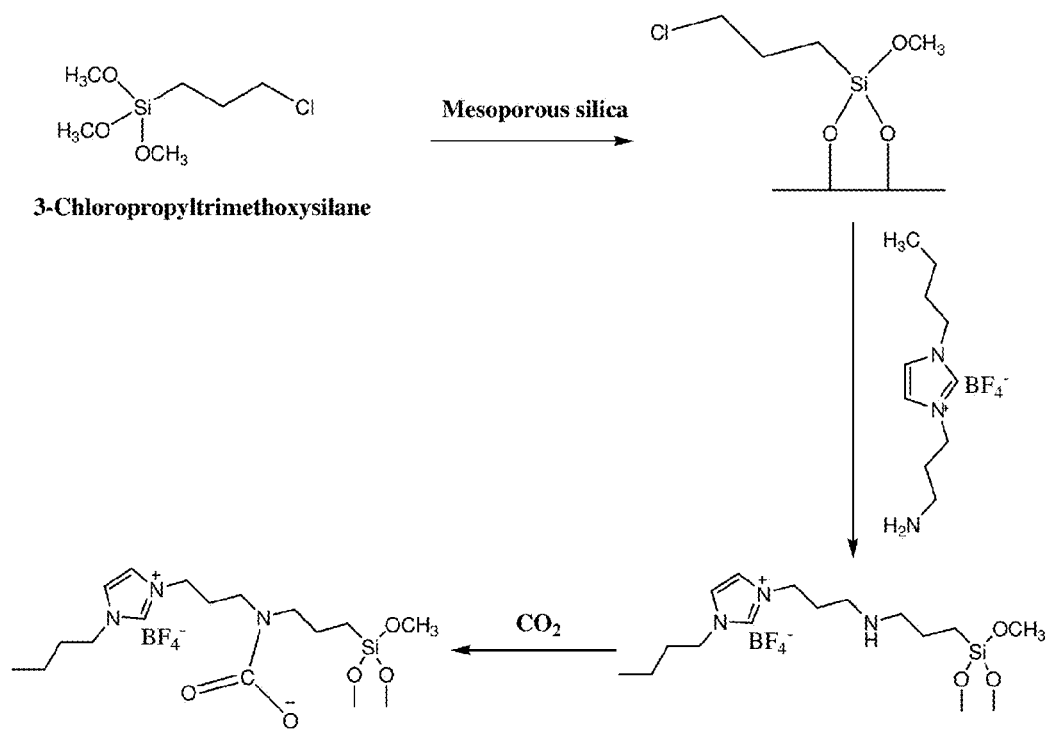
FIG. 2. Schematic showing a particular embodiment by which silica sorbent particles are initially functionalized to bear reactive chloroalkyl groups (i.e., by reaction with chloropropyltrimethoxysilane) followed by reaction with an amino-functionalized ionic liquid to covalently link the ionic liquid to the silica surface via a secondary amine linkage. Upon contact with carbon dioxide, the tethered ionic liquid reactively binds to the carbon dioxide via its secondary amine linkage to produce a carbamate adduct.

FIG. 2 depicts a particular embodiment of the invention in which mesoporous silica particles are first functionalized with reactive chloroalkyl groups by reaction of the silica with chloropropyltrimethoxysilane (other related siloxanes may be used, such as chlorobutyltrimethoxysilane, chlorohexyltrimethoxysilane, bromopropyltrimethoxysilane, and chlorosilane derivatives). The functionalized silica surface is then reacted with an amino-functionalized ionic liquid (e.g., 1-(aminopropyl)-3-butylimidazolium tetrafluoroborate, as known in the art) to provide IL-functionalized sorbent particles. On contact with carbon dioxide, by any of the methods described above, the secondary amino group resulting from linkage of the ionic liquid to the chloroalkyl group reacts with the carbon dioxide to form a carbamate group. The captured carbon dioxide can subsequently be released by any of the desorption methods described above.

Figure 3:
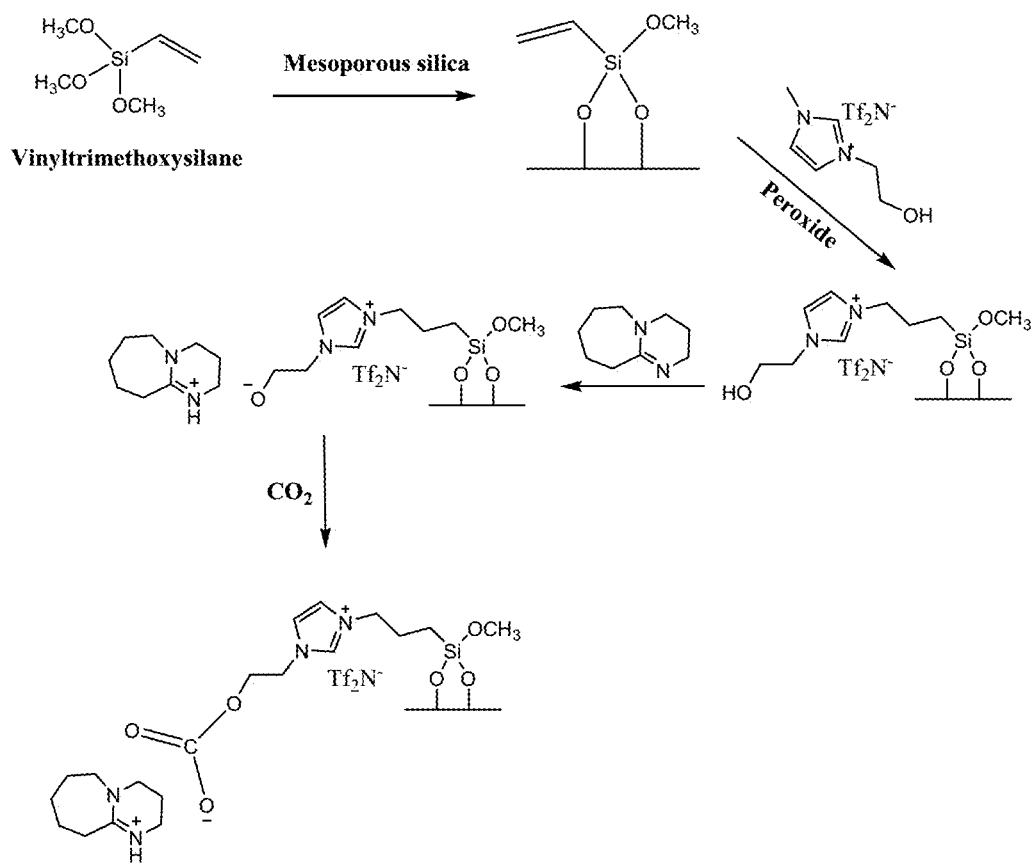
FIG. 3. Schematic showing a particular embodiment by which silica sorbent particles are initially functionalized to bear reactive alkenyl groups (i.e., by reaction with vinyltrimethoxysilane) followed by reaction with an alkenyl-reactive ionic liquid to covalently link the ionic liquid to the silica surface, wherein the ionic liquid also contains an accessible hydroxyalkyl group that is preserved and accessible after linking to the surface. Upon contact with carbon dioxide, the tethered ionic liquid reactively binds to the carbon dioxide via the deprotonated form of its hydroxy group to produce a carbonate adduct.

FIG. 3 depicts a particular embodiment of the invention in which mesoporous silica particles are first functionalized with reactive alkenyl groups by reaction of the silica with vinyltrimethoxysilane (other related siloxanes may be used, such as allyltrimethoxysilane, 3-butenyltrimethoxysilane, 4-pentenyltrimethoxysilane, 5-hexenyltrimethoxysilane, (3-acryloxypropyl)trimethoxysilane, and chlorosilane derivatives). The functionalized silica surface is then reacted with an alkene-reactive ionic liquid, such as by peroxide-induced addition of an N-methylimidazolium-based ionic liquid (e.g., 1-(hydroxyethyl)-3-methylimidazolium $Tf_2N^-$, as known in the art) or by reaction with a thiol-functionalized ionic liquid, to provide IL-functionalized sorbent particles containing an accessible reactive functional group (hydroxyalkyl shown). A superbase, such as any of the superbases described above, is then reacted with the IL-functionalized sorbent particles to maintain the hydroxyalkyl group in deprotonated form. On contact with carbon dioxide, by any of the methods described above, the accessible alkoxide group reacts with the carbon dioxide to form a carbonate group. The captured carbon dioxide can subsequently be released by any of the desorption methods described above.

The invention is particularly directed to an arrangement in which the method, described above, for capturing an electrophilic gas is integrated with a process that produces the electrophilic gas as a byproduct. The process is typically an industrial process, such as a combustion process (e.g., in the burning of a combustible, such as wood or a fossil fuel, such as coal or petroleum, typically for generation of electrical power) or a chemical production process. By being integrated, a gas effluent emanating from the industrial process is directed into the composite structure used in the gas absorption process described above. In some embodiments, the integration provides a continuous process in which gaseous effluent (e.g., a flue gas) is continuously processed by reacting with the composite structure described above, followed by removal (desorption) of the electrophilic gaseous species to regenerate the ionic liquid, and re-use of the regenerated ionic liquid to capture more electrophilic gas.

While there have been shown and described what are at present considered the preferred embodiments of the invention, those skilled in the art may make various changes and modifications which remain within the scope of the invention defined by the appended claims.

What is claimed is:

1. A composite structure for capturing a gaseous electrophilic species, the composite structure comprising refractory hollow fibers with an internal diameter of up to 1000 microns having incorporated therein mesoporous refractory sorbent particles on which an ionic liquid is covalently attached, provided that said refractory hollow fibers containing the mesoporous refractory sorbent particles also contain a bore space that extends through the length of each of said refractory hollow fibers and is surrounded by said mesoporous refactory sorbent particles, wherein said ionic liquid includes an accessible functional group that is capable of binding to said gaseous electrophilic species.

2. The composite structure of claim 1, wherein said gaseous electrophilic species is selected from carbon dioxide, carbon monoxide, and oxides of sulfur.

3. The composite structure of claim 1, wherein said mesoporous refractory sorbent particles have a solid inorganic composition.

4. The composite structure of claim 3, wherein said solid inorganic composition is selected from oxides of main group and transition metals.

5. The composite structure of claim 4, wherein said oxides of main group and transition metals are selected from silica, alumina, aluminosilicate, ceria, yttria, zirconia, niobia, beryllia, scandia, titania, chromium oxide, manganese oxide, iron oxide, cobalt oxide, nickel oxide, zinc oxide, gallium oxide, indium oxide, germanium oxide, tin oxide, perovskite oxides, spinel oxides, and combinations thereof.

6. The composite structure of claim 1, wherein said mesoporous refractory sorbent particles have a size of up to 100 microns.

7. The composite structure of claim 1, wherein said ionic liquid possesses an ammonium cation portion.

8. The composite structure of claim 7, wherein the ammonium cation portion is comprised of a heterocyclic ring having a positively-charged ring nitrogen.

9. The composite structure of claim 8, wherein the heterocyclic ring is selected from imidazolium, benzimidazolium, pyridinium, pyrazinium, pyrrolidinium, piperidinium, piperazinium, morpholinium, pyrrolium, pyrazolium, pyrimidinium, triazolium, oxazolium, thiazolium, triazinium, indolium, quinolinium, quinazolinium, quinoxalinium, pyrrolo[1,2-a] pyrimidinium, and cyclic guanidinium rings.

10. The composite structure of claim 1, wherein said accessible functional group is selected from primary amine, secondary amine, hydroxy, and thiol groups.

11. The composite structure of claim 1, wherein said refractory hollow fibers have a high temperature polymer composition.

12. The composite structure of claim 1, wherein said refractory hollow fibers have a solid inorganic composition.

13. The composite structure of claim 12, wherein said solid inorganic composition is selected from oxides, carbides, borides, nitrides, and silicides of main group and transition metals.

14. The composite structure of claim 1, wherein said refractory hollow fibers have an internal diameter of up to 500 microns.

15. A method for capturing a gaseous electrophilic species, the method comprising flowing said gaseous electrophilic species through bore spaces of a composite structure comprising refractory hollow fibers with an internal diameter of up to 1000 microns having incorporated therein mesoporous refractory sorbent particles on which an ionic liquid is covalently attached, provided that said refractory hollow fibers containing the mesoporous refractory sorbent particles also contain said bore spaces, which extend through the length of each of said refractory hollow fibers and is surrounded by said mesoporous refactory sorbent particles, wherein said ionic liquid includes an accessible functional group capable of binding to said gaseous electrophilic species.

16. The method of claim 15, wherein said method for capturing gaseous electrophilic species is integrated with a process that produces said gaseous electrophilic species as a byproduct.

17. The method of claim 16, wherein said process that produces said gaseous electrophilic species as a byproduct is a combustion process.

18. The method of claim 17, wherein said combustion process is a coal-powered process.

19. The method of claim 15, further comprising removing captured gaseous electrophilic species from said composite structure, and re-using said composite structure for capturing additional gaseous electrophilic species.

20. The method of claim 15, wherein cooling water is passed through said bore spaces of the refractory hollow fibers to facilitate capture of the gaseous electrophilic species, and steam is passed through said bore spaces of the refractory hollow fibers to facilitate release of the gaseous electrophilic species.

21. The method of claim 15, wherein said gaseous electrophilic species is selected from carbon dioxide, carbon monoxide, and oxides of sulfur.

22. The method of claim 15, wherein said ionic liquid possesses an ammonium cation portion.

23. The method of claim 22, wherein the ammonium cation portion is comprised of a heterocyclic ring having a positively-charged ring nitrogen.

24. The method of claim 23, wherein the heterocyclic ring is selected from imidazolium, benzimidazolium, pyridinium, pyrazinium, pyrrolidinium, piperidinium, piperazinium, morpholinium, pyrrolium, pyrazolium, pyrimidinium, triazolium, oxazolium, thiazolium, triazinium, indolium, quinolinium, quinazolinium, quinoxalinium, pyrrolo[1,2-a] pyrimidinium, and cyclic guanidinium rings.

25. The method of claim 15, wherein said accessible functional group is selected from primary and secondary amine groups.

26. The method of claim 15, wherein said accessible functional group is a hydroxy or thiol group, wherein a base that deprotonates said hydroxy or thiol group is in contact with said hydroxy or thiol group during capture of said gaseous electrophilic species.

* * * * *